US006880388B1

(12) United States Patent
Kley

(10) Patent No.: US 6,880,388 B1
(45) Date of Patent: Apr. 19, 2005

(54) ACTIVE CANTILEVER FOR NANOMACHINING AND METROLOGY

(75) Inventor: Victor B. Kley, Berkeley, CA (US)

(73) Assignee: General Nanotechnology LLC, Berkeley, CA (US)

( * ) Notice: Subject to any disclaimer, the term of this patent is extended or adjusted under 35 U.S.C. 154(b) by 146 days.

(21) Appl. No.: 10/228,681

(22) Filed: Aug. 26, 2002

Related U.S. Application Data

(63) Continuation-in-part of application No. 10/094,408, filed on Mar. 7, 2002.

(60) Provisional application No. 60/287,677, filed on Apr. 30, 2001, provisional application No. 60/274,501, filed on Mar. 8, 2001.

(51) Int. Cl.[7] .................. G12B 21/02; G01N 13/10
(52) U.S. Cl. ........................................... 73/105
(58) Field of Search .................... 73/105; 250/306

(56) References Cited

U.S. PATENT DOCUMENTS

| | | |
|---|---|---|
| 3,588,865 A | 6/1971 | Baker et al. |
| 3,812,288 A | 5/1974 | Walsh et al. |
| 4,115,806 A | 9/1978 | Morton |
| 4,604,520 A | 8/1986 | Pohl |
| 4,672,559 A | 6/1987 | Jansson et al. |
| 4,673,477 A | 6/1987 | Ramalingam et al. |
| RE32,457 E | 7/1987 | Matey |
| 4,681,451 A | 7/1987 | Guerra et al. |
| 4,697,594 A | 10/1987 | Mayo, Jr. |
| 4,793,201 A | 12/1988 | Kanai et al. |
| 4,831,614 A | 5/1989 | Duerig |
| 4,866,986 A | 9/1989 | Cichanski |
| 4,907,195 A | 3/1990 | Kazan et al. |
| 4,924,091 A | 5/1990 | Hansma et al. |
| 4,954,704 A | 9/1990 | Elings et al. |
| 4,999,495 A | 3/1991 | Miyata et al. |
| 5,001,344 A | 3/1991 | Kato et al. |
| 5,010,249 A | 4/1991 | Nishikawa |
| 5,015,850 A | 5/1991 | Zdeblick |
| 5,018,865 A | 5/1991 | Ferrell et al. |
| 5,025,346 A | 6/1991 | Tang |
| 5,038,322 A | 8/1991 | Van Loenen |
| 5,043,577 A | 8/1991 | Pohl |
| 5,047,633 A | 9/1991 | Finlan et al. |
| 5,047,649 A | 9/1991 | Hodgson et al. |
| 5,072,116 A | 12/1991 | Kawade et al. |
| 5,081,390 A | 1/1992 | Elings et al. |

(Continued)

FOREIGN PATENT DOCUMENTS

EP          0325056         7/1989

(Continued)

OTHER PUBLICATIONS

TDB-ACC No. NN9201257, IBM Technical Disclosure Bulletin, vol. 34, No. 8, pp 257-259 "Scanning Force Microscope Objective", Jan. 1992.*

(Continued)

*Primary Examiner*—Thomas P. Noland
(74) *Attorney, Agent, or Firm*—Townsend and Townsend and Crew LLP

(57) ABSTRACT

A probe assembly suited for use in a scanning probe microscope (SPM) system includes a cantilever having an attachment to a main body portion. A suitable tip disposed at the free end of the cantilever provides various functions. According to various embodiments of the invention, an interference structure is provided to limit the range of deflection of the probe.

11 Claims, 23 Drawing Sheets

U.S. PATENT DOCUMENTS

| | | |
|---|---|---|
| 5,105,305 A | 4/1992 | Betzig et al. |
| 5,107,112 A | 4/1992 | Yanagisawa et al. |
| 5,108,865 A | 4/1992 | Zwaldo et al. |
| 5,118,541 A | 6/1992 | Yamamoto et al. |
| 5,138,159 A | 8/1992 | Takase et al. |
| 5,142,145 A | 8/1992 | Yasutake |
| 5,148,307 A | 9/1992 | Kopelman et al. |
| 5,155,589 A | 10/1992 | Gere |
| 5,166,520 A | 11/1992 | Prater et al. |
| 5,187,367 A | 2/1993 | Miyazaki |
| RE34,214 E | 4/1993 | Carlsson et al. |
| 5,210,410 A | 5/1993 | Barrett |
| 5,216,631 A | 6/1993 | Sliwa |
| 5,220,555 A | 6/1993 | Yanagisawa |
| 5,231,286 A | 7/1993 | Kajimura et al. |
| 5,241,527 A | 8/1993 | Eguchi |
| 5,249,077 A | 9/1993 | Laronga |
| 5,254,209 A | 10/1993 | Schmidt et al. |
| 5,254,854 A | 10/1993 | Betzig |
| 5,260,824 A | 11/1993 | Okada et al. |
| 5,276,672 A | 1/1994 | Miyazaki |
| 5,278,704 A | 1/1994 | Matsuda |
| 5,283,437 A | 2/1994 | Greschner et al. |
| 5,289,004 A | 2/1994 | Okada et al. |
| 5,289,408 A | 2/1994 | Mimura |
| 5,297,130 A | 3/1994 | Tagawa |
| 5,299,184 A | 3/1994 | Yamano |
| 5,302,239 A | 4/1994 | Roe et al. |
| 5,308,974 A | 5/1994 | Elings et al. |
| 5,317,152 A | 5/1994 | Takamatsu |
| 5,317,533 A | 5/1994 | Quate |
| 5,319,961 A | 6/1994 | Matsuyama et al. |
| 5,319,977 A | 6/1994 | Quate |
| 5,322,735 A | 6/1994 | Fridez et al. |
| RE34,708 E | 8/1994 | Hansma et al. |
| 5,338,932 A | 8/1994 | Theodore et al. |
| 5,343,460 A | 8/1994 | Miyazaki |
| 5,349,735 A | 9/1994 | Kawase |
| 5,353,632 A | 10/1994 | Nakagawa |
| 5,354,985 A | 10/1994 | Quate |
| 5,357,109 A | 10/1994 | Kusumoto |
| 5,357,110 A | 10/1994 | Statham |
| 5,360,977 A | 11/1994 | Onuki et al. |
| 5,362,963 A | 11/1994 | Kopelman et al. |
| 5,373,494 A | 12/1994 | Kawagishi |
| 5,389,475 A | 2/1995 | Yanagisawa |
| 5,392,275 A | 2/1995 | Kawada et al. |
| 5,393,647 A | 2/1995 | Neukermans et al. |
| 5,396,483 A | 3/1995 | Matsuda |
| 5,408,094 A | 4/1995 | Kajimura |
| 5,412,641 A | 5/1995 | Shinjo |
| 5,414,260 A | 5/1995 | Takimoto et al. |
| 5,414,690 A | 5/1995 | Shido et al. |
| 5,416,331 A | 5/1995 | Ichikawa et al. |
| 5,418,363 A | 5/1995 | Elings et al. |
| 5,426,631 A | 6/1995 | Miyazaki et al. |
| 5,453,970 A | 9/1995 | Rust et al. |
| 5,455,420 A | 10/1995 | Ho et al. |
| 5,461,605 A | 10/1995 | Takimoto |
| 5,463,897 A | 11/1995 | Prater et al. |
| 5,471,458 A | 11/1995 | Oguchi et al. |
| 5,472,881 A | 12/1995 | Beebe et al. |
| 5,490,132 A | 2/1996 | Yagi et al. |
| 5,495,109 A | 2/1996 | Lindsay et al. |
| 5,502,306 A | 3/1996 | Meisburger et al. |
| 5,506,829 A | 4/1996 | Yagi |
| 5,510,615 A | 4/1996 | Ho et al. |
| 5,519,686 A | 5/1996 | Yanagisawa et al. |
| 5,548,117 A | 8/1996 | Nakagawa |
| 5,559,328 A | 9/1996 | Weiss et al. |
| 5,560,244 A | 10/1996 | Prater et al. |

| | | |
|---|---|---|
| 5,583,286 A | 12/1996 | Matsuyama |
| 5,602,820 A | 2/1997 | Wickramasinghe et al. |
| 5,610,898 A | 3/1997 | Takimoto |
| 5,623,476 A | 4/1997 | Eguchi |
| 5,634,230 A | 6/1997 | Maurer |
| 5,644,512 A | 7/1997 | Chernoff et al. |
| 5,679,952 A | 10/1997 | Lutwyche et al. |
| 5,717,680 A | 2/1998 | Yamano |
| 5,721,721 A | 2/1998 | Yanagisawa |
| 5,751,683 A | 5/1998 | Kley |
| 5,756,997 A | 5/1998 | Kley |
| 5,763,879 A | 6/1998 | Zimmer et al. |
| 5,804,709 A | 9/1998 | Bourgoin et al. |
| 5,821,410 A | 10/1998 | Xiang et al. |
| 5,825,670 A | 10/1998 | Chernoff et al. |
| 5,865,978 A | 2/1999 | Cohen |
| 5,874,726 A | 2/1999 | Haydon |
| 5,883,387 A | 3/1999 | Matsuyama et al. |
| 5,922,214 A | 7/1999 | Liu et al. |
| 6,031,756 A | 2/2000 | Gimzewski et al. |
| 6,066,265 A | 5/2000 | Galvin et al. |
| 6,101,164 A | 8/2000 | Kado et al. |
| 6,144,028 A | 11/2000 | Kley |
| 6,173,604 B1 | 1/2001 | Xiang et al. |
| 6,199,269 B1 | 3/2001 | Greco et al. |
| 6,201,226 B1 | 3/2001 | Shimada et al. |
| 6,229,138 B1 | 5/2001 | Kley |
| 6,229,607 B1 * | 5/2001 | Shirai et al. ............... 73/105 X |
| 6,229,609 B1 | 5/2001 | Muramatsu et al. |
| 6,232,597 B1 | 5/2001 | Kley |
| 6,239,426 B1 * | 5/2001 | Muramatsu et al. .......... 73/105 |
| 6,242,734 B1 | 6/2001 | Kley |
| 6,252,226 B1 | 6/2001 | Kley |
| 6,265,711 B1 | 7/2001 | Kley |
| 6,281,491 B1 | 8/2001 | Kley |
| 6,337,479 B1 | 1/2002 | Kley |
| 6,339,217 B1 | 1/2002 | Kley |
| 6,340,813 B1 | 1/2002 | Tominaga et al. |
| 6,353,219 B1 | 3/2002 | Kley |
| 6,369,379 B1 | 4/2002 | Kley |
| 6,396,054 B1 | 5/2002 | Kley |
| 6,507,553 B1 | 1/2003 | Kley |
| 6,515,277 B1 | 2/2003 | Kley |
| 6,517,249 B1 | 2/2003 | Doll |
| 6,614,227 B1 * | 9/2003 | Ookubo .................... 73/105 X |
| 2001/0010668 A1 | 8/2001 | Kley |
| 2002/0007667 A1 | 1/2002 | Pohl et al. |
| 2002/0117611 A1 | 8/2002 | Kley |
| 2002/0135755 A1 | 9/2002 | Kley |
| 2003/0167831 A1 | 9/2003 | Kley |

FOREIGN PATENT DOCUMENTS

| | | |
|---|---|---|
| JP | 61-133065 | 6/1986 |
| JP | 1-262403 | 10/1989 |
| JP | 7-105580 | 4/1995 |
| WO | WO 96/03641 A1 | 2/1996 |
| WO | WO 97/04449 | 2/1997 |
| WO | WO 98/34092 A2 | 8/1998 |
| WO | WO 01/03157 | 1/2001 |
| WO | WO03/046473 | 6/2003 |
| WO | WO04/023490 | 3/2004 |

OTHER PUBLICATIONS

Ager et al., "Multilayer hard carbon films with low wear rates,"*Surface and Coatings Technology,* 91:91-94 (1997).

Betzig et al "Near-Field Optics: Microscopy Spectroscopy and Surface Modification Beyond the Diffraction Limit" Science 257:(1992), Jul. pp. 189-195.

Dai et al. "Nanotubes as nanoprobes in scanning probe microscopy," Nature 384:147-150 (1986), Nov.

Davis "Deposition characterization and device development in diamond silicon cerbide and gallium nitride thin films" J. Vac. Sci. Technol. A 11(4). Jul./Aug. (1993), pp. 829 & 832-837.

Diaz, D.C., et al., An Improved Fabrication Technique for Porous Silicon, Rev. Sci. Instrum.64 (2). Feb. 1993, pp. 507-509.

Givargizov et al "Growth of diamond particles on sharpened silicon tips" Materials Letters 18:(1993), pp 1-2, Nov., pp. 61-63.

Gomyou, H., et al. Effect of Electrochemical Treatments on the Photoluminescence from Porous Silicon, J. Electrochem. Soc., vol. 139, No. 9, Sep. 1992, pp. L86-L88.

Nossarzewska-Orlowska, E., et al., Photoluminescence Properties of Porous Silicon Prepared by Electrochemical Etching of Si Epitaxial Layer, Acta Physica Polonica A, No. 4. vol. 84 (1993), pp. 713-716, Oct.

Rasmussen et al. "Fabrication of an All-metal Atomic Force Microscope Probe," IEEE (1997), Jun., pp. 463-466.

Rossow, U., et al., Influence of the Formation Conditions on the Microstructure of Porous Silicon Layers Studied by Spectroscopic Ellipsometry, Thin Solid Films, 255 (1995), pp. 5-8, Nos. 1-2.

Smestad, G., et al., Photovoltaic Response in Electrochemically Prepared Photoluminescent Porous Silicon, Solar Energy Materials and Solar Cells, 26, pp. 277-283 (1992).

Tang, William Chi-Keung, "Electrostatic comb drive for resonant sensor and actuator applications," Abstract of dissertation at the University of California at Berkeley (1990), 1 page.

Toledo-Crow et al "Near-field differential scanning optical microscope with atomic force regulation" Appl. Phys. Lett. 60: (1992), vol. 24, Jun., pp. 2957-2959.

Van Hulst et al "Near-field optical microscope using a silicon-nitride probe" Appl. Phys. Lett. 62: No. 5 (1993), Feb. pp. 461-463.

Watson et al "The Radiation Patterns of Dielectric Rods-Experiment Theory" Journal of Applied Physics 19: (1948), Jul. pp. 661-670.

* cited by examiner

ACTIVE CANTILEVER FOR NANOMACHINING AND METROLOGY

CROSS-REFERENCES TO RELATED APPLICATIONS

This application is a continuation-in-part application of pending U.S. application Ser. No. 10/094,408, filed Mar. 7, 2002, which in turn claims priority from the following provisional applications, the entire disclosures of which are incorporated by reference in their entirety for all purposes:

U.S. Application No. 60/274,501, filed Mar. 8, 2001 by Victor B. Kley for "Scanning Probe Microscopy and Nanomachining;" and U.S. Application No. 60/287,677, filed Apr. 30, 2001 by Victor B. Kley for "Scanning Probe Microscopy and Nanomachining."

The following five U.S. patent applications have been filed concurrently with U.S. application Ser. No. 10/094, 408, the entire disclosures of which are incorporated by reference in their entirety for all purposes:

U.S. patent application Ser. No. 10/094,148, filed Mar. 7, 2002 by Victor B. Kley for "Method and Apparatus for Scanning in Scanning Probe Microscopy and Presenting Results";

U.S. patent application Ser. No. 10/093,842, filed Mar. 7, 2002 by Victor B. Kley for "Nanomachining Method and Apparatus";

U.S. patent application Ser. No. 10/094,411, filed Mar. 7, 2002 by Victor B. Kley for "Methods and Apparatus for Nanolapping";

U.S. patent application Ser. No. 10/094,149, filed Mar. 7, 2002 by Victor B. Kley for "Low Friction Moving Interfaces in Micromachines and Nanomachines"; and U.S. patent application Ser. No. 10/093,947, filed Mar. 7, 2002 by Victor B. Kley and Robert T. LoBianco for "Method and Apparatus for Tool and Tip Design for Nanomachining and Measurement".

The following U.S. patents are incorporated by reference in their entirety for all purposes:

U.S. Pat. No. 6,144,028, issued Nov. 7, 2000 to Victor B. Kley for "Scanning Probe Microscope Assembly and Method for Making Confocal, Spectrophotometric, Near-Field, and Scanning Probe Measurements and Associated Images;"

U.S. Pat. No. 6,252,226, issued Jun. 26, 2001 to Victor B. Kley for "Nanometer Scale Data Storage Device and Associated Positioning System;"

U.S. Pat. No. 6,337,479, issued Jan. 8, 2002 to Victor B. Kley for "Object Inspection and/or Modification System and Method;" and U.S. Pat. No. 6,339,217, issued Jan. 15, 2002 to Victor B. Kley for "Scanning Probe Microscope Assembly and Method for Making Confocal, Spectrophotometric, Near-Field, and Scanning Probe Measurements and Associated Images."

The disclosure of the following published PCT application is incorporated by reference in its entirety for all purposes:

WO 01/03157 (International Publication Date: Jan. 11, 2001) based on PCT Application No. PCT/US00/18041, filed Jun. 30, 2000 by Victor B. Kley for "Object Inspection and/or Modification System and Method."

BACKGROUND OF THE INVENTION

This invention is related generally to the field of Atomic Force Microscopy (AFM), Scanning Tunneling Microscopy (STM), Near field Scanning Optical Microscopy (NSOM), NanoSpectroPhotometry (NSP), NanoPolarimetry (NP), Magnetic Field Microscopy (MFM) and any other methods adaptable and suitable to guide the nanomachining techniques described herein. Specifically, the invention is directed to scanning probes for use in AFM, NSOM, NSP, NP, MFM and STM technologies. These technologies are sometimes collectively referred to as Scanning Probe Microscopy (SPM). Generally, SPM technologies allow one to "see" atomic-scale features on or in surfaces.

An AFM works by scanning a tip over a surface much the same way as a phonograph needle scans a record. The tip is located at the end of a cantilever beam and positioned over the surface to be scanned. The combination of the cantilever beam and tip is sometimes referred to collectively as a scanning probe or simply a probe.

AFM techniques rely on the effects of the inter-atomic interactions, such as van der Waals forces, that arise between the atoms in the structure of the tip and the atoms at the surface being imaged. As the tip is repelled by or attracted to the surface, the cantilever beam is deflected. The magnitudes of the deflections correspond to the topological features of the atomic structure of the surface being scanned. The AFM can work with the tip touching the sample (contact mode), or the tip can tap across the surface (tapping mode).

STM techniques rely on the fact that the electron cloud associated with the atoms at the surface extends a very small distance above the surface. When a tip—in practice, a needle which has been treated so that a single atom projects from its end—is brought sufficiently close to such a surface, there is a strong interaction between the electron cloud on the surface and that of the tip atom. An electric tunneling current flows when a small voltage is applied. The tunneling current is very sensitive to the distance between the tip and the surface. These changes in the tunneling current with distance as the tip is scanned over the surface are used to produce an image of the surface.

AFM is being used to solve processing and materials problems in a wide range of technologies affecting the electronics, telecommunications, biological, chemical, automotive, aerospace, and energy industries. The materials being investigated include thin and thick film coatings, ceramics, composites, glasses, synthetic and biological membranes, metals, polymers, and semiconductors. The AFM is being applied to studies of phenomena such as abrasion, adhesion, cleaning, corrosion, etching, friction, lubrication, plating, and polishing.

The STM is widely used in both industrial and fundamental research to obtain atomic-scale images of surfaces. It can provide a three-dimensional profile of the surface which is very useful for characterizing surface roughness, observing surface defects, and determining the size and conformation of molecules and aggregates on the surface.

Different SPM tasks, such as metrology, mechanical transport, nanofabrication, nanomanipulation, and nanomachining operations and/or measurements, impose different requirements in the behavior of the SPM probe. Conventionally, different probes are used for different functions.

BRIEF SUMMARY OF THE INVENTION

Scanning probe assemblies according to the invention include a main body portion and a cantilever attached or otherwise connected to the main body portion. Disposed at a free end of the cantilever is a probe tip suitably configured for various scanning probe operations. In various embodiments, an interference structure is provided as a supporting structure for the cantilever. The interference structure limits the range of deflections of the cantilever during a scanning operation. A further understanding of the nature and advantages of the present invention may be realized by reference to the remaining portions of the specification and the drawings.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Figure 1:
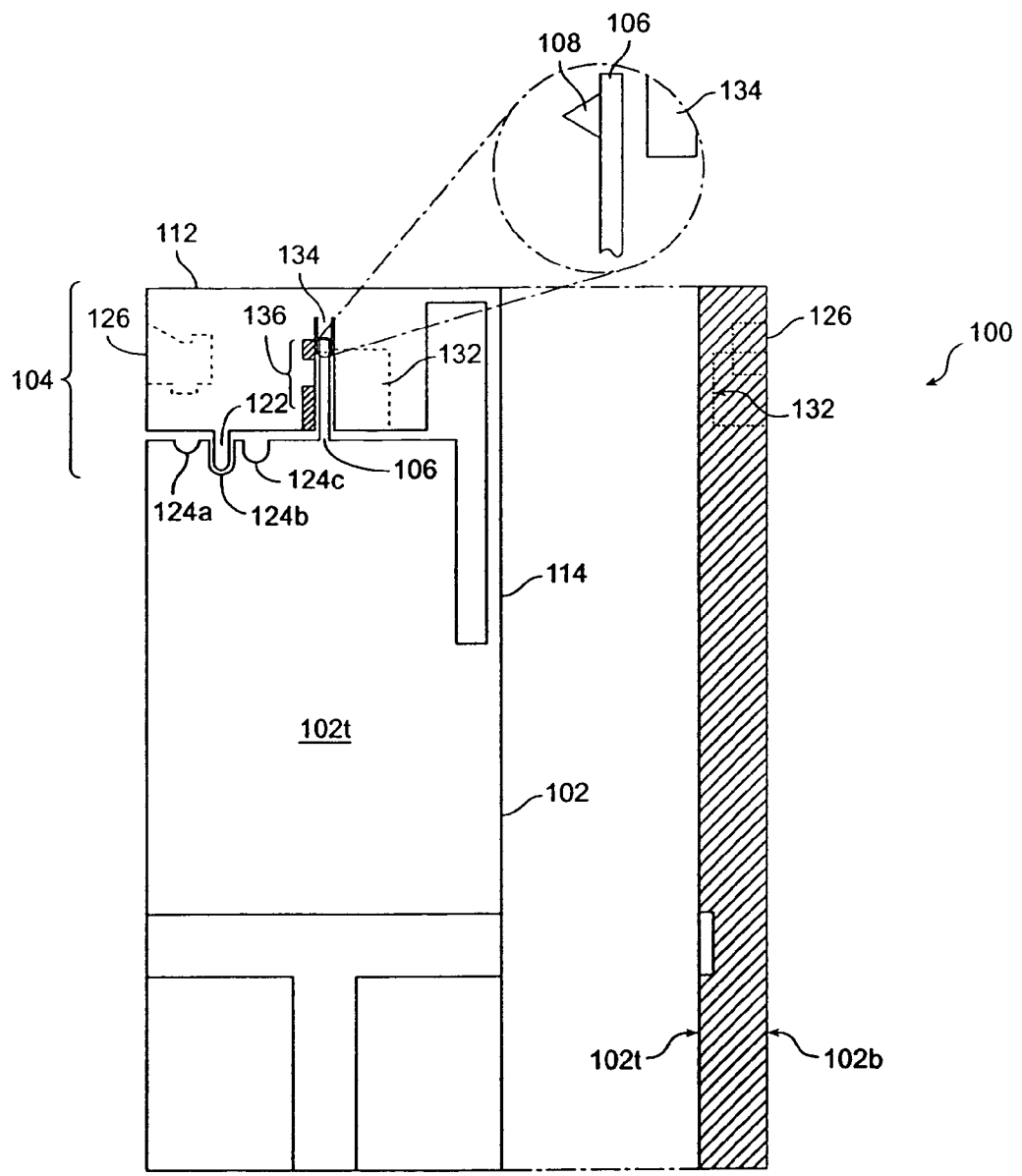
FIGS. 1 and 1A are top view diagrams illustrating an embodiment of a probe assembly in accordance with the present invention.

FIG. 1 is a top view of a probe assembly 100 in accordance with an illustrative embodiment of the present invention. In a particular embodiment of the invention, the material comprising the probe assembly is bulk silicon. Using well known and understood semiconductor fabrication techniques, appropriate combinations of etching and deposition processing steps can be performed to form the structural features comprising the probe assembly.

A main body portion 102 provides mechanical support for the smaller structures of probe assembly. Typical dimensions of the main body portion shown by this illustrative embodiment include a length of about 4250 μm, a width of about 1600 μm, and a thickness of about 512 μm. Actual dimensions are expected to vary from one SPM configuration to another.

The probe assembly 100 includes a cantilever assembly 104. Additional detail of the cantilever assembly is shown in the enlarged circle region illustrated in FIG. 1 and the enlarged portion of the probe assembly shown in FIG. 2. The cantilever assembly comprises a cantilever 106 having a fixed end connected to the main body portion 102. An appropriate probe tip 108 is provided at the free end of the cantilever.

The cantilever 106 extends into an interior region of an assembly head 112. A flexural attachment 114 connects the assembly head to the main body portion 102. The flexural attachment allows the assembly head to be moved about, as will be explained below. The flexural attachment is dimensioned accordingly so as to be resilient and thus be "springy." When the flexural attachment is stretched from the resting position shown in FIG. 2, a restoring force will be exerted to urge the attachment back to its resting position.

The assembly head 112 comprises a variety of structural features. A finger projection 122 extends into a plurality of recesses 124a–124c formed into a portion of the main body portion 102. A latch handle recess 126 is formed into the assembly head along a surface portion that can be externally accessed. From the top view shown in FIGS. 1 and 2, and the side view shown in FIG. 1, it can be seen that the latch handle recess is formed from a portion of the bottom surface 102b of the probe assembly 100, and in particular from a bottom surface portion of the assembly head.

The interior region of the assembly head 112 into which the cantilever 106 extends, is provided with a variety of interacting structures in accordance with the invention. A land 132 is a structural element formed in the assembly head. From the top view shown in FIGS. 1 and 2, and the side view shown in FIG. 1, it can be seen that the land is a recessed region formed, for example, by an etching process starting from a portion of a bottom surface 102b of the probe assembly 100, and in particular from a bottom surface portion of the assembly head.

Another structural element formed in the assembly head 112 is an auxiliary cantilever 134. This structure is defined by cutouts 134a and extends from the assembly head toward the primary cantilever 106 slightly overlapping the primary cantilever. The auxiliary cantilever is displaced in the Z-direction (referenced by the axes illustrated in the figures) such that it is positioned behind the primary cantilever.

Figure 2:
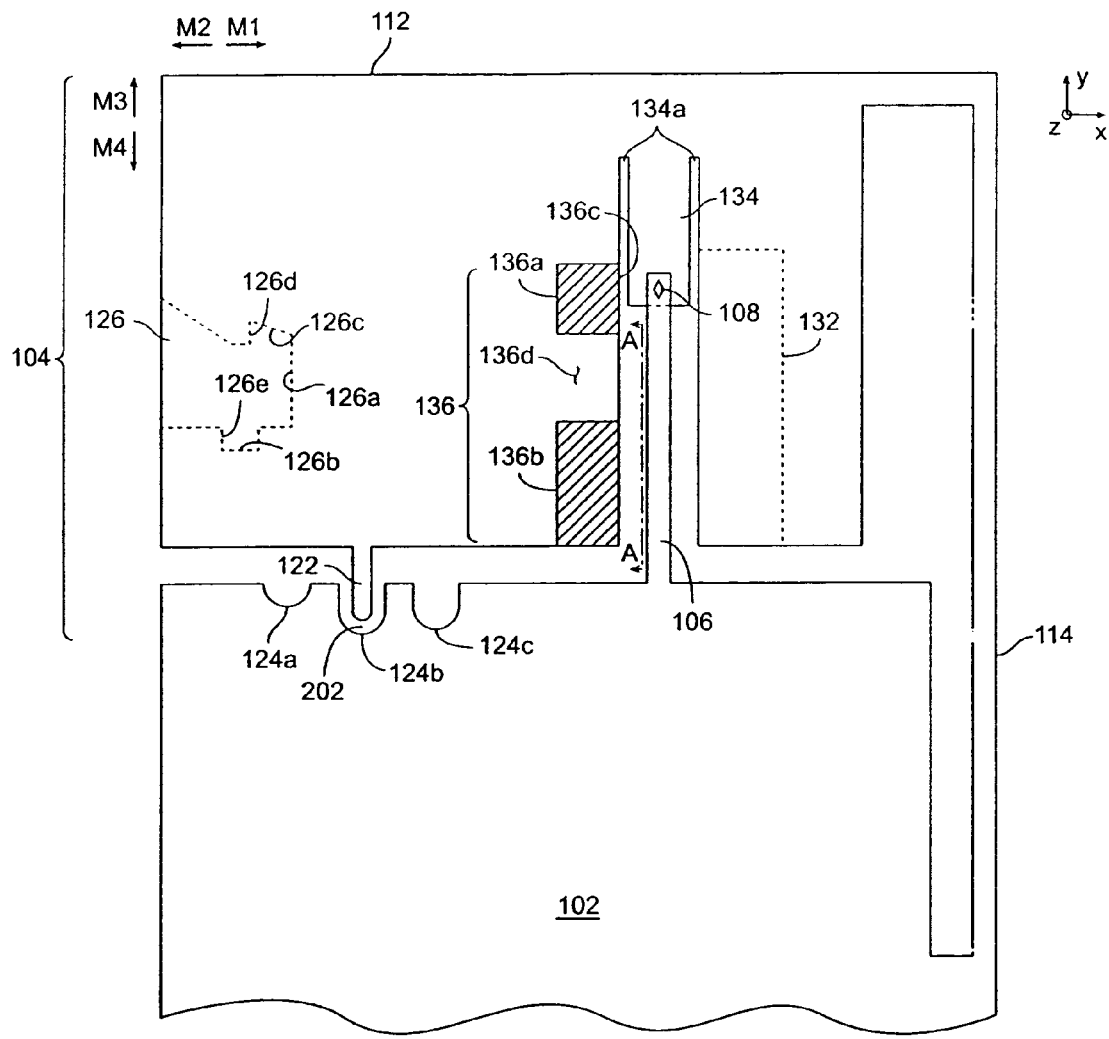
FIG. 2 shows an enlarged view of the cantilever assembly portion of the probe assembly shown in FIG. 1.
Figure 2A:
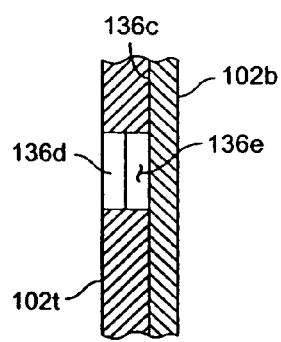
FIG. 2A shows a side view taken along view line A—A in FIG. 2.

Still another structural element formed on the assembly head 112 is a locking structure 136. From the top view shown in FIG. 2, it can be seen that the locking structure comprises relief areas 136a and 136b formed from top surface portions of the assembly head 112, exposing a surface 136c. FIG. 2A shows a side view taken along view lines A—A shown in FIG. 2. The locking structure includes a slotted opening 136e defined as the space between a lip 136d and the exposed surface 136c.

Figure 1A:
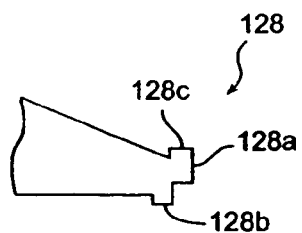

FIG. 1A shows a fixed-structure end effector 128. As the name implies, this structure is a fixed structure. It can be formed at a known location on a workpiece (not shown) to be operated on by the probe assembly 100 in the SPM. Generally, the end effector 128 can be provided at a known, or otherwise predictable, location elsewhere in the SPM. In still another configuration, plural such structures at known, or otherwise predictable locations can be provided.

The end effector 128 has a structure that corresponds to the latch handle recess structure 126 on the assembly head 112. The latch handle recess structure is defined in part by a surfaces 126a–126e. The end effector has corresponding boss structures 128a–128c, which engage the surfaces 126a–126e of the latch handle recess structure.

Figure 1B:
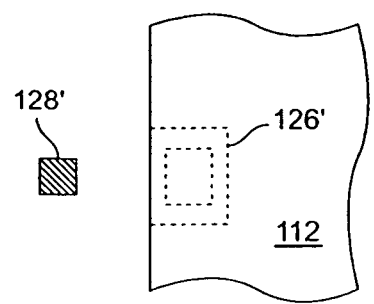
FIGS. 1B and 1C are top view diagrams illustrating variations of the latch handle recess shown in FIG. 1A.

FIG. 1B shows another embodiment of a latch handle recess 126' and end effector 128'. The earlier described embodiment is more of an arbitrary shape, illustrating that any suitable configuration of these structures is possible, as illustrated by structures 126' and 128'.

Figure 1C:
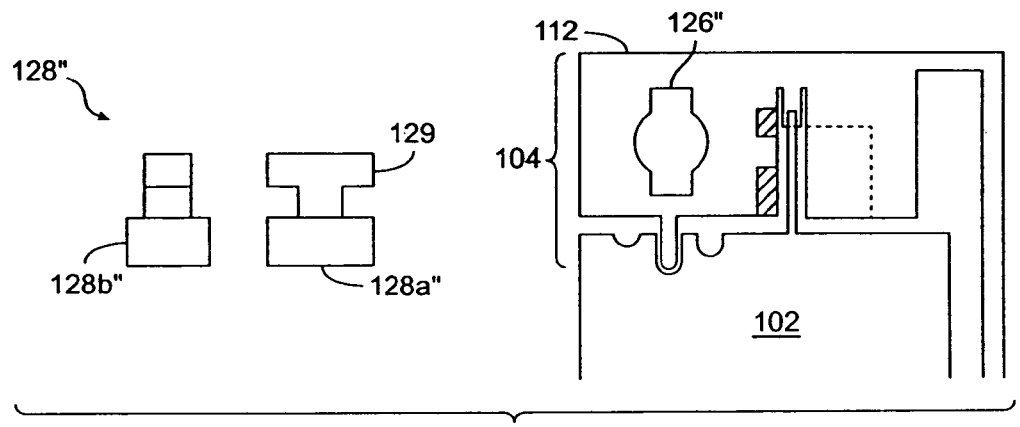

FIG. 1C is an enlarged view of the cantilever assembly 104, illustrating yet another embodiment of the latch handle recess structure 126". In this particular embodiment, the latch handle is formed through the body of the assembly head 112. The correspondingly shaped end effector 128" is shown in two side views 128a" and 128b". The view 128a" shows a locking flange 129. In operation, the latch recess 126" is aligned with the end effector 128", oriented as shown in 128a". The assembly head 112 is lowered over the end effector and then turned 90° to engage the locking flange. At that point, the assembly head can be manipulated accordingly by appropriate X-, Y-, and Z-direction translations of the probe assembly 100.

Figure 17:
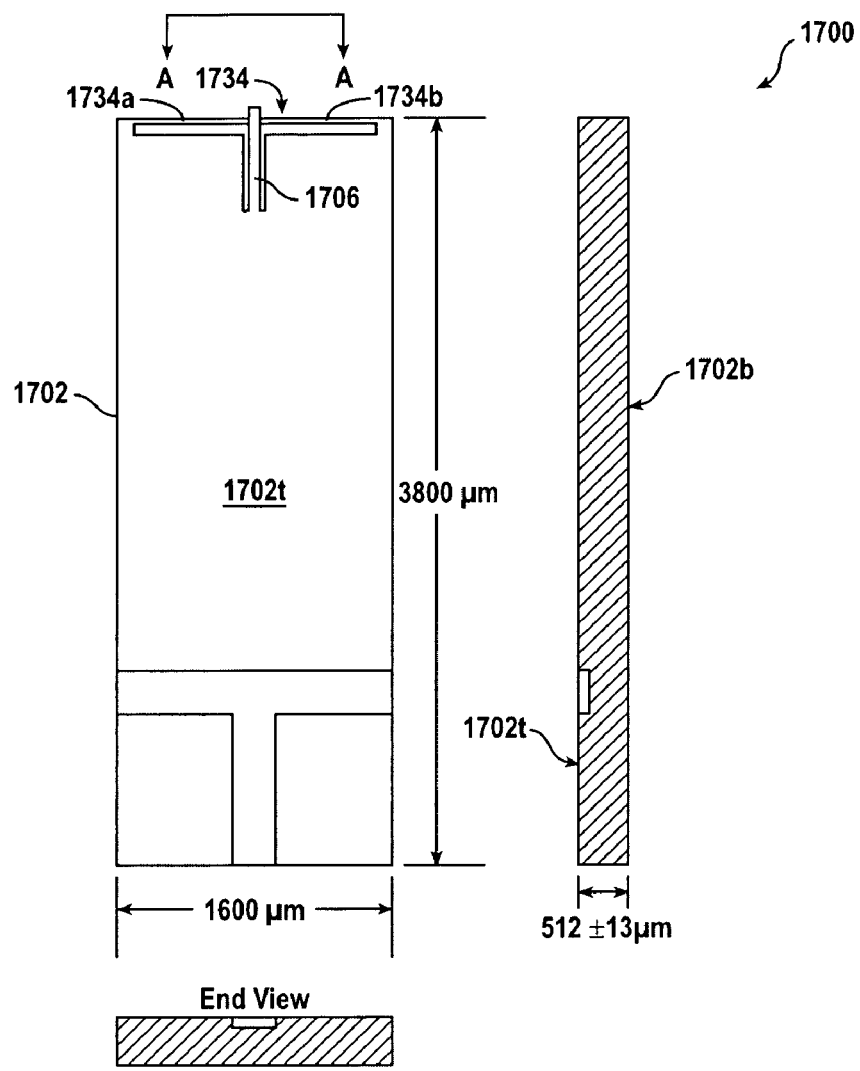
FIGS. 17 and 17A–17C show various views illustrating an alternative embodiment of a probe assembly in accordance with the present invention.
Figure 18:
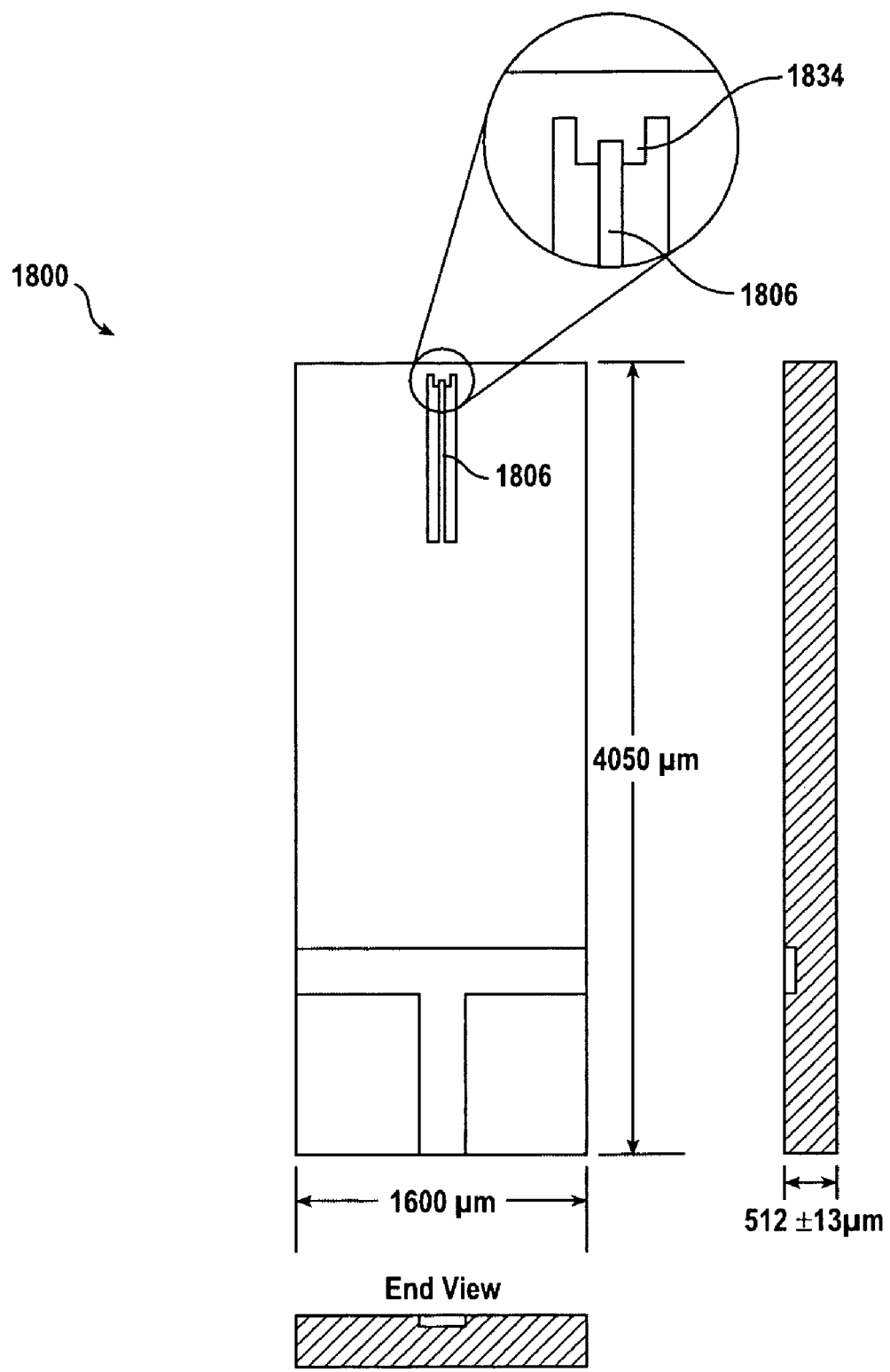
FIG. 18 shows yet another embodiment of a probe assembly in accordance with the present invention.

Refer for a moment to FIGS. 17 and 18 for a discussion of alternative embodiments of a probe assembly in accordance with the present invention. FIG. 17 shows a probe 1700 having a main body portion 1702 and a cantilever assembly. Typical dimensions are shown in the figure for a particular construction of the probe. It is noted, however, that alternate constructions and dimensions suitable for a particular application can be obtained. The cantilever assembly comprises a primary cantilever 1706 component and a secondary cantilever component 1734. The secondary cantilever component comprises two extending members 1734a and 1734b that extend toward each other to form a gap beneath the primary cantilever.

Figure 17A:
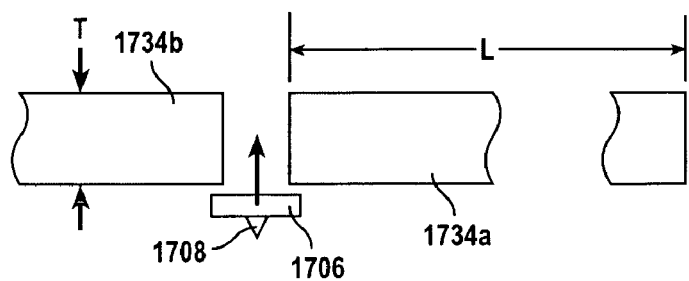

FIG. 17A is a view of the probe 1700 taken along view line A—A shown in FIG. 17. This figure shows more clearly the arrangement of the secondary cantilever 1734 component. During a scanning operation, when the probe tip 1708 is deflected by the atomic force interaction of the probe tip and the surface being scanned, the primary cantilever will at times be deflected in the direction indicated by the arrow. The secondary cantilever 1734 limits the range of travel during such deflections. This may be desirable in scanning probe applications where the primary cantilever is extremely thin. A thin cantilever permits highly sensitive scanning. Conventionally, however, such thin probes tend to be quite fragile. The secondary cantilever, by providing a backing, prevents excessive flexing of the primary cantilever.

As can be seen in FIG. 17A, the stiffness (i.e., spring constant) of the secondary cantilever can be determined at the time of fabrication in various ways. For example, the length L of each extending member 1734a, 1734b can be selected. Similarly, the thickness of the extending members can be controlled to obtain a desired dimension. The thickness of the extending members can be varied along their lengths, if such a design is appropriate for a particular application. Finally, the dimensions of the primary cantilever 1706 can also be adjusted. Of course the primary cantilever and the secondary cantilever may or may not have similar spring constants (or stiffness ratings).

Figure 17B:
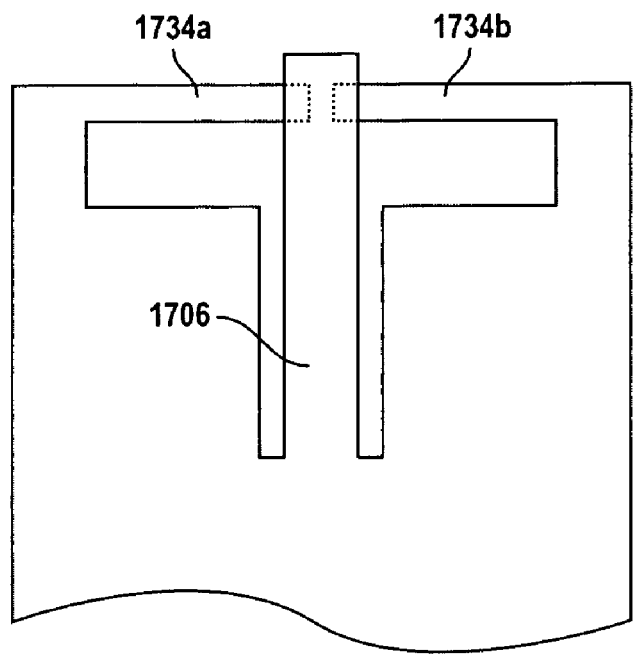
Figure 17C:
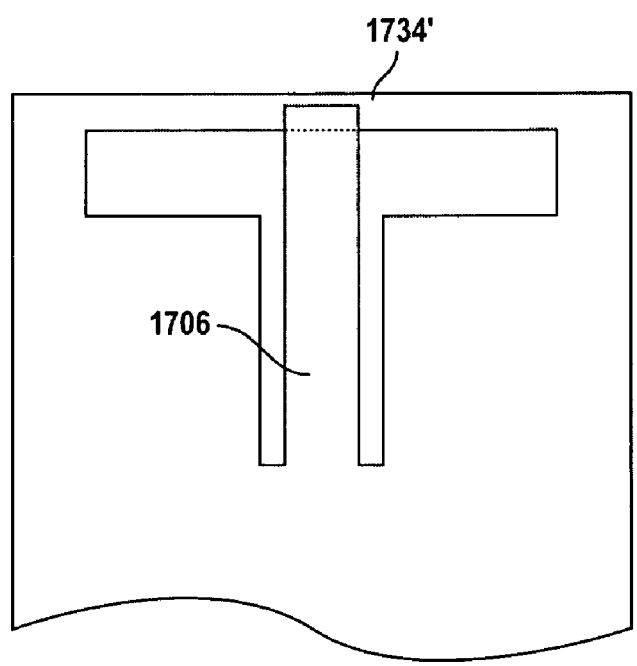

FIG. 17A also shows an embodiment in which the extending arms are joined (shown by the phantom lines) to constitute a single supporting bridge. The close-up views shown in FIGS. 17B and 17C illustrate these embodiments. FIG. 17B shows the two extending members 1734a, 1734b of the secondary cantilever 1734. Depending on a particular application, it can be appreciated that the second cantilever comprises a single extending member, or conversely that the second cantilever comprises three of more extending members.

FIG. 17C shows an alternative embodiment wherein the secondary cantilever comprises a supporting bridge construction 1734'. FIGS. 17B and 17C also illustrate that the primary cantilever 1706 can extend beyond the secondary cantilever, as shown in FIG. 17B, or can fall short of the full reach of the secondary cantilever, as shown in FIG. 17C. Generally, the conditions in which the scanning probe will be used is likely to dictate the specific arrangement of the primary and second cantilever components.

FIG. 18 shows a construction of a scanning probe in accordance with yet another embodiment of the invention. In this particular embodiment, a secondary cantilever 1834 similar to the auxiliary cantilever 134 of FIG. 1 is provided to serve a similar function as the secondary cantilever 1734 of FIG. 17. Here, the secondary cantilever extends in along a direction parallel to the primary cantilever. Like the auxiliary cantilever shown in FIG. 1 and the secondary cantilever arrangement shown in FIG. 17, the secondary cantilever in FIG. 18 intersects with the line of travel of the primary cantilever to limit certain deflections of the primary cantilever.

From the foregoing, one can appreciate that a variety of alternative constructions are possible for providing a secondary cantilever to serve as a backing or a range-of-motion-limiting structure for the primary cantilever. It can be appreciated that such structures need not be in parallel relation with the primary cantilever or is perpendicular to the primary cantilever. The figures are specific examples of more general structures which interfere with the motion of the probing cantilever (e.g., 106, FIG. 1; 1706, FIG. 17; and 1806, FIG. 18) in certain directions. In addition, while these "interference structures" are shown in the particular implementations as formed with the main body portion, it can be appreciated that alternative implementations may employ a structure that is separate from the main body portion, if such a configuration is desirable.

Figure 3:
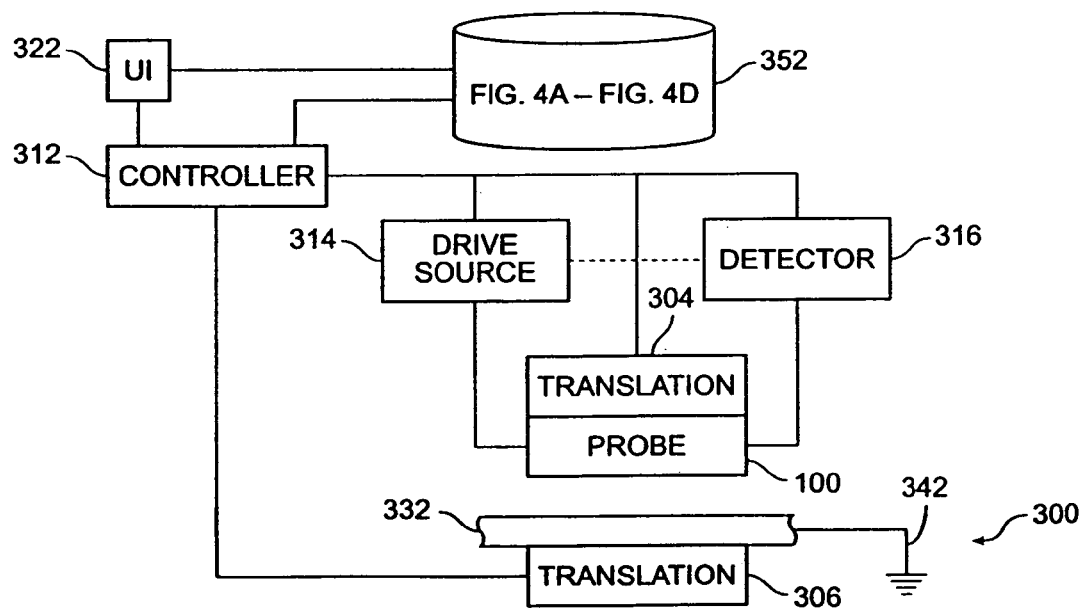
FIG. 3 shows a high level block diagram of an SPM system adapted with the apparatus and methods of the present invention.

FIG. 3 shows an illustrative embodiment of a scanning probe microscopy (SPM) system 300 adapted with apparatus and techniques of the present invention. A probe 302 (e.g., probe 100 in FIG. 1, probe 1700 in FIG. 17, or probe 1800 in FIG. 18) can be coupled to a first translation stage 304. The first translation stage can provide movement of the probe in the X-Y plane. By convention, the X-Y plane is the plane parallel to the major surface of a workpiece 332. Thus, the probe can be positioned in the X-Y position relative to the workpiece by the first translation stage. The first translation stage can also provide movement of the probe in the Z-direction, and thus position the probe in three-dimensional space relative to the workpiece. Translation stages are known and well understood devices. Typically, they are piezoelectric devices.

Alternatively, a second translation stage 306 can be provided. The workpiece 332 can be affixed to the second translation stage to provide X-Y motion of the workpiece relative to the probe 302. Furthermore, the second translation stage can provide motion of the workpiece in the Z direction relative to the probe.

The relative motion between the probe 302 and the workpiece 332 can be achieved by any of a number of techniques. The probe can be translated in three dimensions while maintaining the workpiece in a stationary position. Conversely, the workpiece can move relative to a stationary probe. Both the probe and the workpiece can be moved in a coordinated fashion to achieve rapid positioning. The first translation stage 304 might provide only X-Y motion, while Z-axis positioning is provided by the second translation stage 396; or vice-versa. These and still other combinations of concerted motions of the probe and the workpiece can be performed to effect relative motion between the probe and the workpiece.

A drive source 314 delivers energy to operate the probe 302. In (non-contact and/or tapping) AFM mode, the drive energy can be any form of energy suitable to resonate the probe. In STM mode, the structure remains fixed (by being pushed into a very stiff secondary cantilever or locked down using the described methods and the cantilever is not resonated.

A detection module 316 is coupled to detect atomic interactions between the atoms which constitute the probe tip 108 (FIG. 1) and the constituent atoms of the surface being scanned. The detection module can employ any number of well known detection techniques to accommodate for the different modes of operation of the SPM. For example, if the probe is operated in AFM (atomic force microscopy) non-contact mode, the cantilever resonance point is shifted by the interatomic forces acting between the tip and the surface as the tip is scanned across the surface. The resonance changes can be measured optically or electrically. In contact mode the direct deflections can be measured optically. A series of raster scans is then conventionally used to form a surface map of the area scanned and may be capable of producing data representative of the atomic scale topography of the surface.

A generalized controller 312 can be configured to provide various computer-based functions such as controlling the components of the SPM system, performing data collection and subsequent analysis, and so on. Typically, the controller is some computer-based device; for example, common architectures are based on a microcontroller, or a general purpose CPU, or even a custom ASIC-based controller.

Appropriate control software is provided to operate the computing components to perform the foregoing functions. For example, control signals coordinate the components of the SPM system. It is understood that the generalized controller functions can be allocated to other system components to meet particular system requirements and constraints for a given implementation. For example, data analysis functionality can easily be off-loaded to another computer. The SPM system 300 can have a network connection to a larger system. It is well within the capability of persons of ordinary skill in the relevant arts to produce the appropriate programming code needed to perform the control sequencing and delivery of control signals to coordinate the various components of the SPM system 300 to effect the techniques of the present invention.

A user interface 322 is provided to allow a user to interact with the system. The "user" can be a machine user. A machine interface might be appropriate in an automated environment where control decisions are provided by a machine.

A data store 352 contains various information to facilitate SPM operations and for overall operation of the SPM system. The data store contains the programming code that executes on the controller 312 in accordance with the probe translation sequences illustrated in FIGS. 4A–4D. The data store shown in the figure can be any appropriate data storage technology, ranging from a single disk drive unit to a distributed data storage system.

Figure 4A:
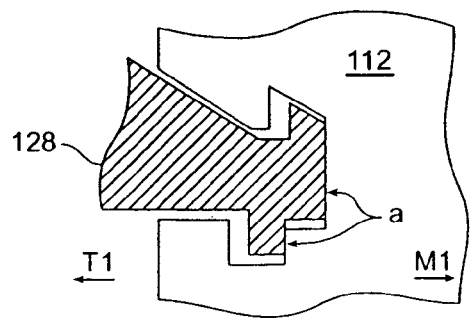
FIGS. 4A–4D illustrate assembly head movements in accordance with an illustrative embodiment of the present invention.

FIGS. 4A–4D illustrate the use of the fixed-structure end effector 128 to effect movement of the assembly head 112. As mentioned above, the end effector has a known or otherwise predictable location. In this case, the probe 302 of the type such as probe 100 shown in FIG. 1. It is first translated to the location of the end effector, aligning the latch handle recess 126 above it (recall that the recess is formed from the bottom surface 102b). The probe is lowered so that the end effector is received in the latch handle recess. FIG. 4A shows that the probe can be translated in the direction T1 to effect movement of the assembly head 112 in the direction M1 (see also FIG. 2). The end effector and latch handle recess contact at surface "a." Since the end effector is stationary and the assembly head has a flexible connection 114 to the main body portion 102, the assembly head will move generally in the direction M1.

Figure 4B:
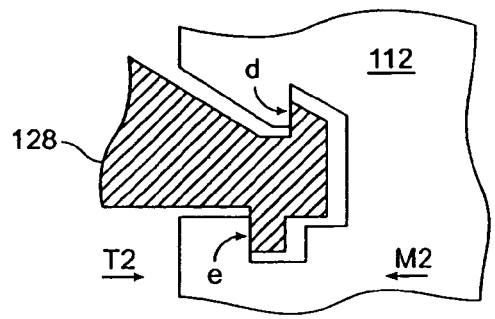
Figure 4C:
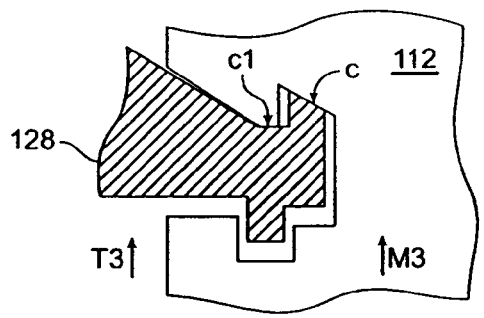
Figure 4D:
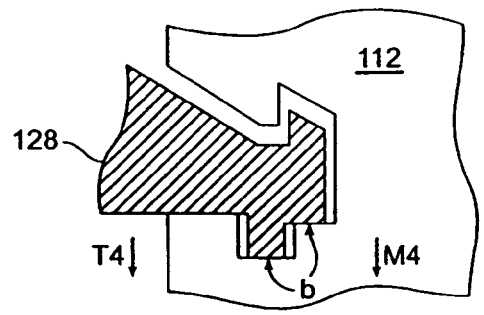

FIG. 4B shows the probe 100 being translated in the direction T2. The contacting surfaces are "d" and "e." Consequently, the assembly head 112 will be moved in the direction M2 (see also FIG. 2). FIG. 4C shows the probe being translated in the direction T3, with contacting surfaces "c" and "c1." The assembly head moves in the direction M3. Finally, FIG. 4D shows the probe translation to be in the direction T4, with the consequent movement of the assembly head in the direction M4.

From the foregoing, it can be appreciated that the disclosed shapes of the end effector 128 and the latch handle recess 126 are not necessary. In fact, it can be further appreciated that the latch handle recess need not be correspondingly matched to the shape of the end effector. Furthermore, motion vectors other that M1–M4 can be provided.

Figure 5:
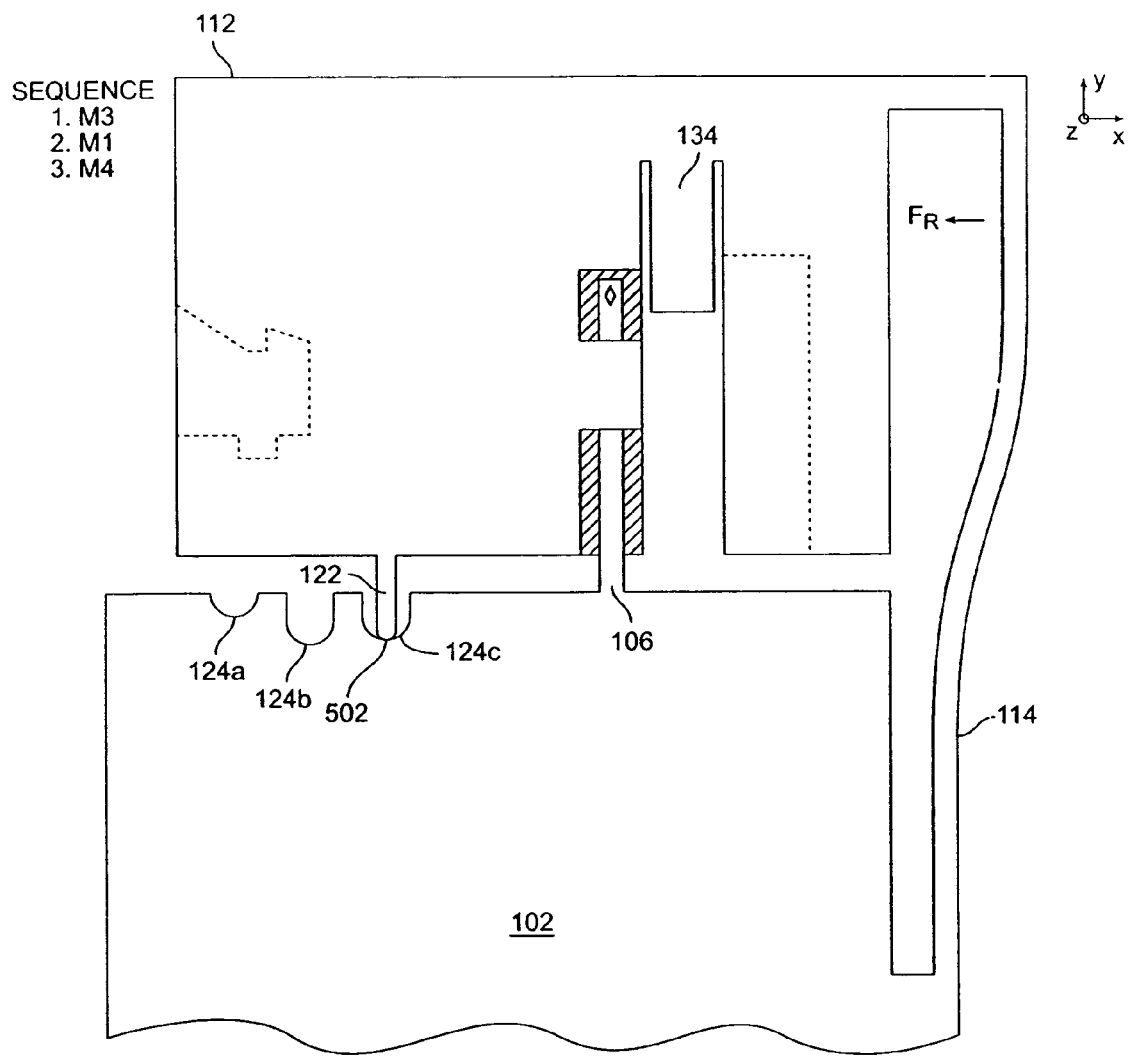
FIG. 5 shows a locked position configuration of the assembly head.

FIG. 5 shows a configuration of the probe assembly 100 of FIG. 1 according to the principles of the present invention. The assembly head 112 shown in FIG. 2 is by convention referred to as the neutral position, so-called because the flexural attachment 114 is in a relaxed (resting) state and thus exerts no restoring force, indicated also by the gap 202 formed in the recess 124b.

Turning now to FIG. 5, it can be seen that the assembly head has been moved or otherwise repositioned from the neutral position to a so-called "locked" position where the assembly head has been moved so that the finger projection is now placed in the recess 124c. For example, a sequence of moves might include moving the assembly head, first in the direction M3 (see FIGS. 4A–4D), then in the direction M1, and then M4, accomplished by translating the probe assembly 100 in the manner discussed above. As can be seen, the flexural attachment 114 being stretched will exert a restoring force $F_R$ in the general direction indicated by the arrow. However, the finger projection is disposed in recess 124c generally at contact 502. The contact 502 is maintained by the restoring force exerted by the flexural attachment, thus preventing the finger projection from escaping the recess. Consequently, the assembly head does not return to the neutral position, remaining instead in the locked position shown.

The cantilever 106 remains stationary relative to the moving assembly head 112. Consequently, as the assembly head is moved to the right, the locking structure 136 is brought into alignment with the cantilever. More specifically, the slotted opening 136e of the locking structure straddles the cantilever so that the latter is nestled in slotted opening of the locking structure. The relief 136a exposes the tip 108. As can be seen in the locked configuration, the action of the cantilever is affected by the locking structure by limiting the Z-direction movement. The locking structure 136 can be appropriately dimensioned to limit Z-direction movement of the cantilever depending on the requirements of the SPM application.

The configuration shown in FIG. 5 is well suited for STM applications. The cantilever 106 in this configuration can be made quite rigid if the slotted opening 136e is appropriately dimensioned. The cantilever in the locked position can be electrically arranged to measure tunnel current and/or conductivity differently than when the cantilever is in the unengaged or common state or neutral position, since the rigid position allows conduction through insulating layers and oxides while the rigid structure is necessary to build the tunnel current data or closed loop constant tunnel current necessary for Scanning Tunneling Microscopy. In addition, the cantilever is well suited as a very stiff nanomachining structure capable of removing material with tip tool shapes which are positive (i.e., tools which self-feed while cutting) in the cut directions. The stiffness of the cantilever limits, to a large extent if not entirely, the self-feeding effect of a positive cutting tool. Nanomachining is discussed in more detail in some of the above-identified co-pending U.S. applications for patent.

To complete the discussion of FIG. 5, the neutral position can be restored by providing a reverse sequence of moves. For example, if the assembly head 112 is moved (e.g., according to FIGS. 4A–4D) in the M3 direction, the M2 direction, and the M4 direction, a return to the neutral position is achieved.

Figure 6A:
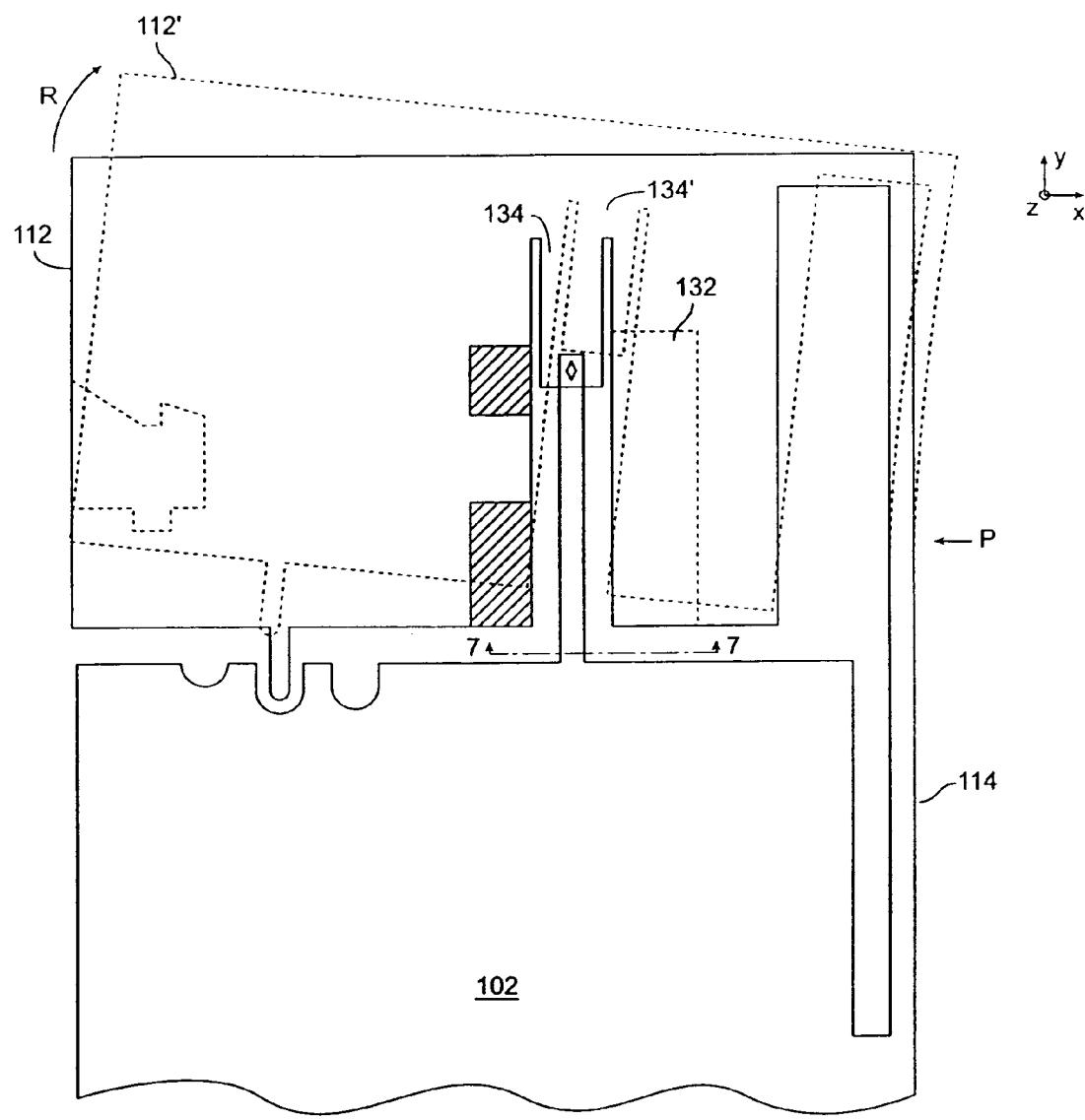
FIGS. 6A and 6B show a transport position configuration of the assembly head.
Figure 6B:
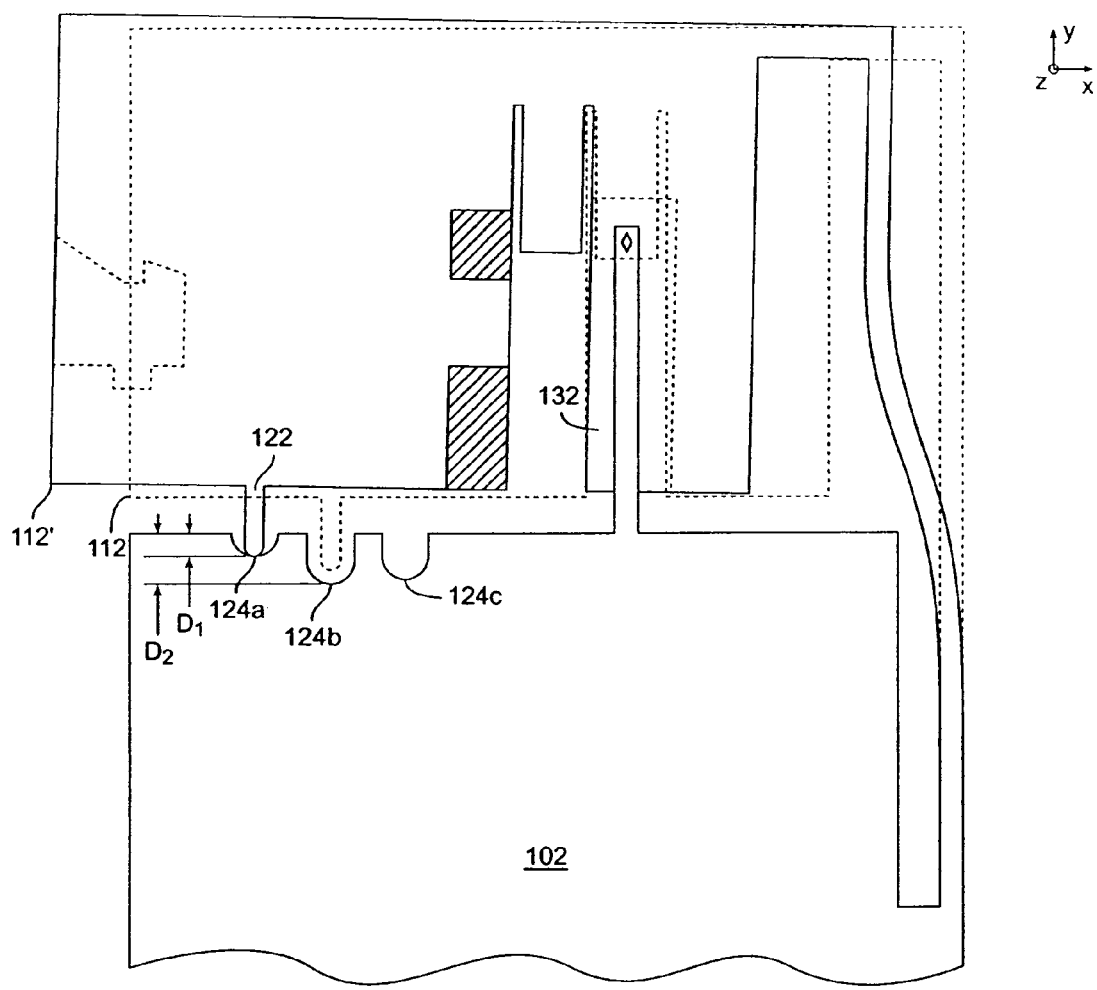
Figure 7A:
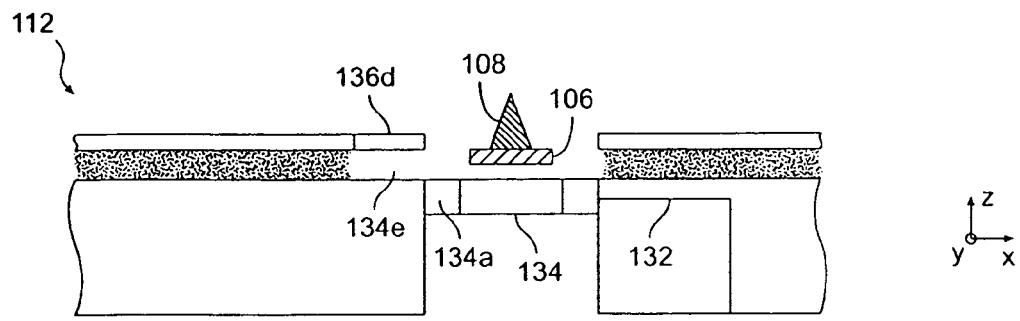
FIGS. 7A–7C show a sequence for aligning the assembly head with the cantilever to achieve the transport position shown in FIG. 6B.
Figure 7B:
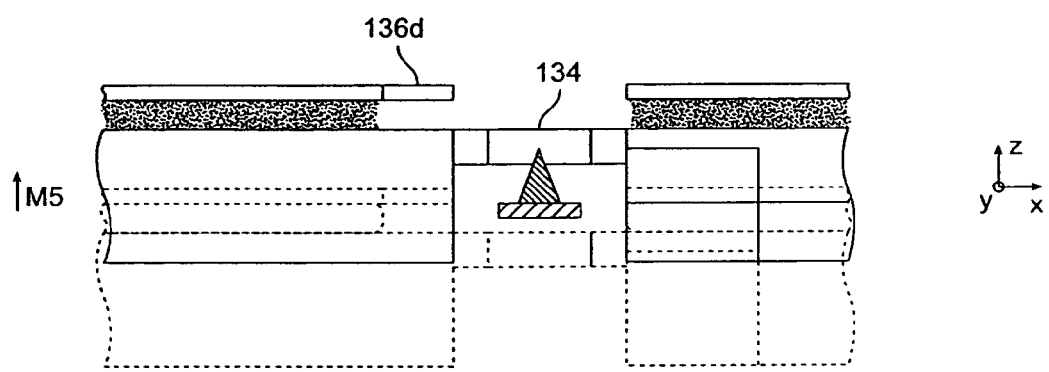
Figure 7C:
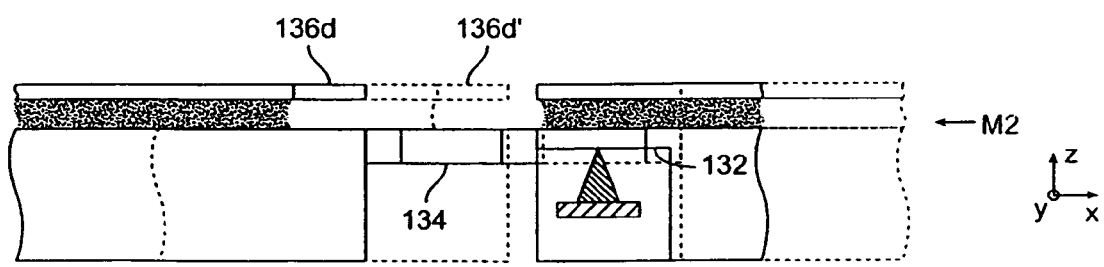

FIGS. 6A, 6B, and 7A–7C show the sequencing for another configuration of the assembly head 112. This configuration is referred to as a "transport" position. FIGS. 6A and 6B shown the sequence of moves of the assembly head for this configuration. FIGS. 7A–7C show a view taken along view line 7—7 shown in FIG. 6A. The "transport" position is the configuration illustrated in FIG. 6B and in FIG. 7C, where the land 132 is aligned with the cantilever 106 so that the tip is positioned upon the land 132. This alignment of the assembly head affects the operation of the cantilever by locking down the tip. This stabilizes the cantilever and provides protection of the tip during transportation of the probe assembly 100.

The view of FIG. 7A shows that, the neutral position of the assembly head 112, the auxiliary cantilever 134 is "below" (in the Z-direction) the cantilever 106. The land 132, likewise, is below the cantilever. In order to maneuver the assembly head 112 into the transport position, the cantilever must be relatively positioned in a downward direction. However, in the neutral position, the cantilever blocked by the auxiliary cantilever.

FIG. 6A shows a movement of the assembly head 112 to a position 112' indicated in phantom. This movement is roughly an arcuate motion indicated by the arrow R, about a pivot location P on the flexural attachment 114. The result is to rotate or otherwise move the auxiliary cantilever 134 out of alignment (134') with respect to the cantilever 106. Alternatively, the assembly head 112 might be moved in more of a vertical direction. Any movement of the assembly head that clears the cantilever 106 from the auxiliary cantilever 134 is sufficient.

FIG. 7A now represents the view taken along view line 7—7 in FIG. 6A where the assembly head 112 is in position 112'. FIG. 7B shows movement of the assembly head in the direction M5 which is accomplished by a Z-direction translation of the probe assembly 100 down upon the end effector 128. Since, the assembly head has a flexible attachment, it will move up in the Z-direction. This is illustrated in FIG. 7B, where the phantom represents the assembly head prior to the lowering translation. It can be seen that the tip 108 comes into alignment in the Z-direction with the land 132.

FIG. 7C shows that the assembly head 112 is then moved in the M2 direction (see FIGS. 4A–4D) to position the tip 108 in facing relation to the land 132. A subsequent upward translation of the probe assembly 100 will allow the restoring force of the flexural attachment 114 to urge the assembly head downward. Referring to FIGS. 7C and 6B, the move in the M2 direction aligns the finger projection with the recess 124a. The detent level $D_1$ of the recess 124a is smaller than the detent level $D_2$ of the recess 124b. This insures that the auxiliary cantilever 134 is maintained clear of the cantilever 106 when it is held in the transport position in the land 132. The restoring force further insures that the finger projection 122 remains within recess 124a, thus locking the assembly head 112 in this transport position configuration.

The lockdown position can result in adhesion and/or stiction effects. To facilitate the subsequent restoring of the cantilever 106/assembly head 112 to the neutral position, known treatments such as biochemical treatments, the use of slipping coating such as diamond like carbon (DLC), and other similar techniques can be used to help release of the structures.

Figure 8:
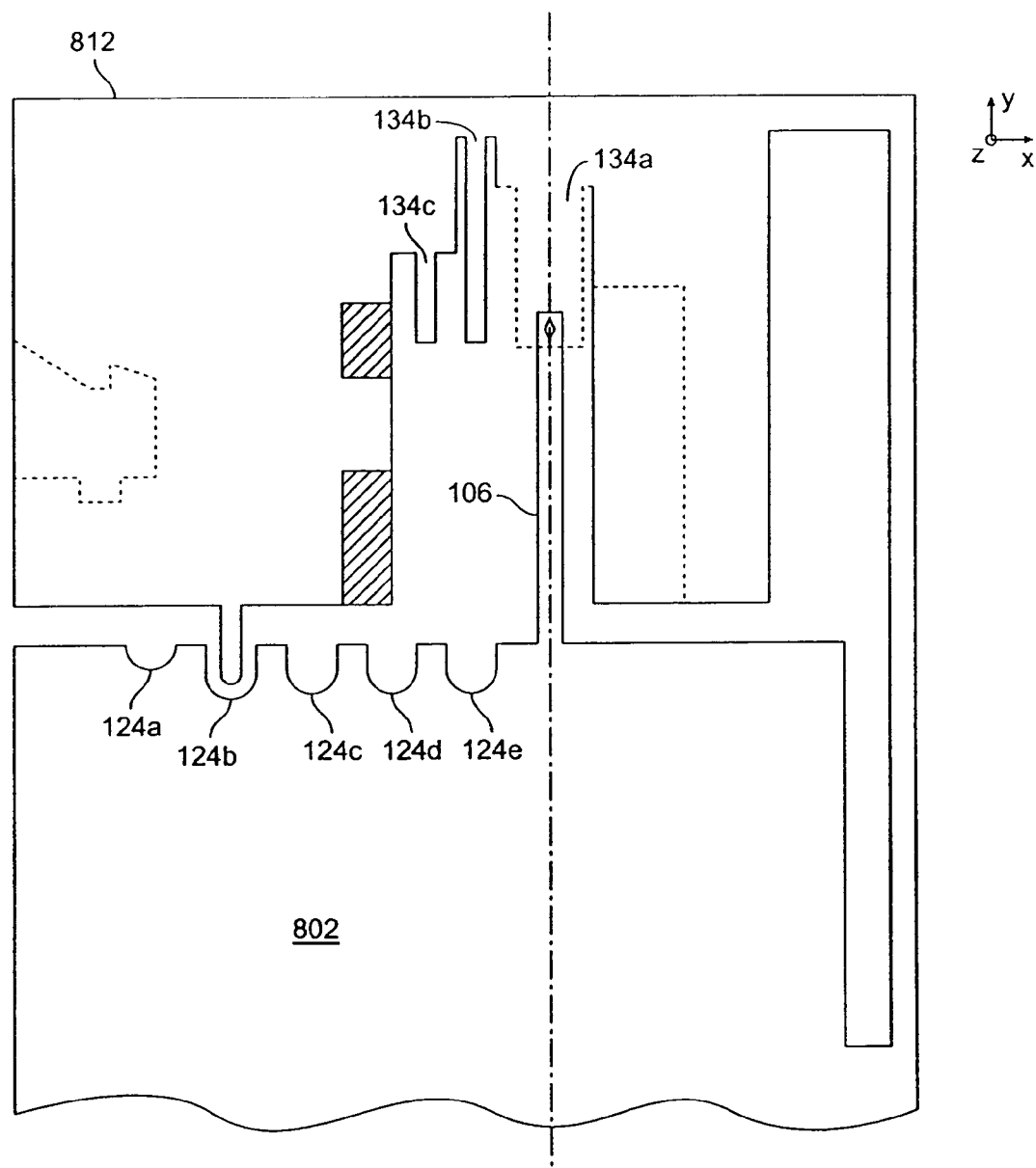
FIG. 8 show an embodiment of the invention wherein the assembly head includes additional structures which can be brought into alignment with the cantilever.

FIG. 8 shows an alternative embodiment of the assembly head 812. This embodiment illustrates that plural auxiliary cantilevers 134a–134c can be provided. Such cantilevers may be electrically isolated and addressable by external or local (active circuitry on the cantilever body) means. Corresponding recesses 124c–124e are provided so that the assembly head can be positioned so as to align the desired auxiliary cantilever with the cantilever (call it the primary cantilever) 106. Auxiliary cantilevers serve to increase the spring constant of the probe action. The increased spring constant can facilitate various operations such nanomachining, current measurements, voltage measurements, and so on with a contact or non-contact cantilever. When the probe tip 108 is pushed into a target material, the cantilever 106 will flex and if there is sufficient flex, it will engage a stiffer auxiliary cantilever. Thus, the cantilever/auxiliary cantilever combination allows for a cantilever 106 to be flexible by design, which is desired for sensitivity of surface detection, and still be stiff enough to perform nanomachining. Having plural auxiliary cantilevers makes the probe assembly that much more versatile.

Alternatively, the auxiliary cantilever 134 can be monitored by all the well known optical and electrical deflection techniques. The auxiliary cantilever can be used in a capacitive positioning system, where the auxiliary cantilever and the primary cantilever 106 form the plates of a capacitor. Surface features can be detected by monitoring the change in capacitance. In yet another use, the auxiliary cantilever can serve to drive the resonance in the primary cantilever. In another use, ultrasonic acoustic energy can be coupled from the auxiliary cantilever into the primary cantilever and in conjunction with an appropriate downward force perform nanoacoustic welding or nanomachining of very small structures under the tip 108.

FIG. 8 illustrates still another variation of the assembly head 812 wherein auxiliary cantilever 134a is not provided. In this embodiment, the cantilever 106 is not aligned with and structure when the assembly head is in the neutral position.

FIGS. 9A–13C show alternate configurations for the auxiliary cantilever 134, including a top view, a side view, and a head-on view of each configuration. Each configuration is shaped to minimize surface adhesion, due to any mechanism including moisture and stiction. This is accomplished by reducing the shape, providing interior holes, and so on to reduce the surface area that contacts the primary cantilever 106. These (sticking) latter mechanisms may be used to enhance and stabilize the primary cantilever mechanically in contact with the secondary cantilever. When stiction is particularly high and release of the primary cantilever from the secondary is desired, repulsive electrical decoupling (like charges put on the primary and secondary cantilevers) or mechanical decoupling (a secondary sliding structure which pushes out the primary cantilever) may be used.

Figure 9A:
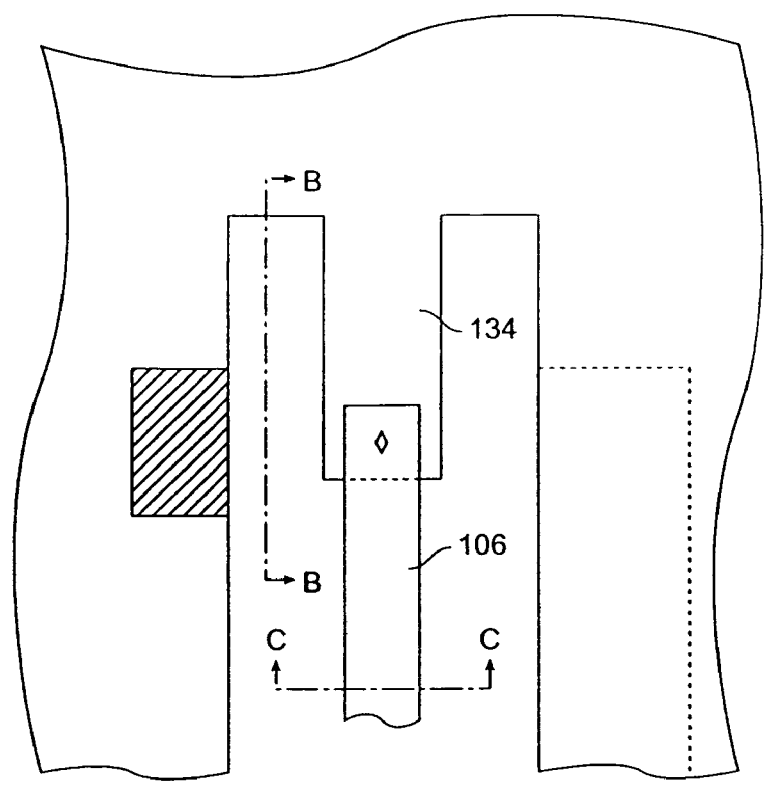
FIGS. 9A–9C, 10A–10C, 11A–11C, 12A–12C, and 13A–13C show various views of alternate configurations of the auxiliary cantilever.
Figure 9B:
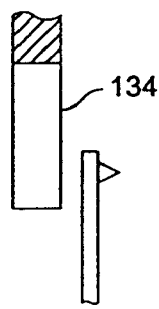
Figure 9C:
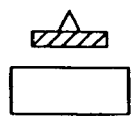
Figure 10A:
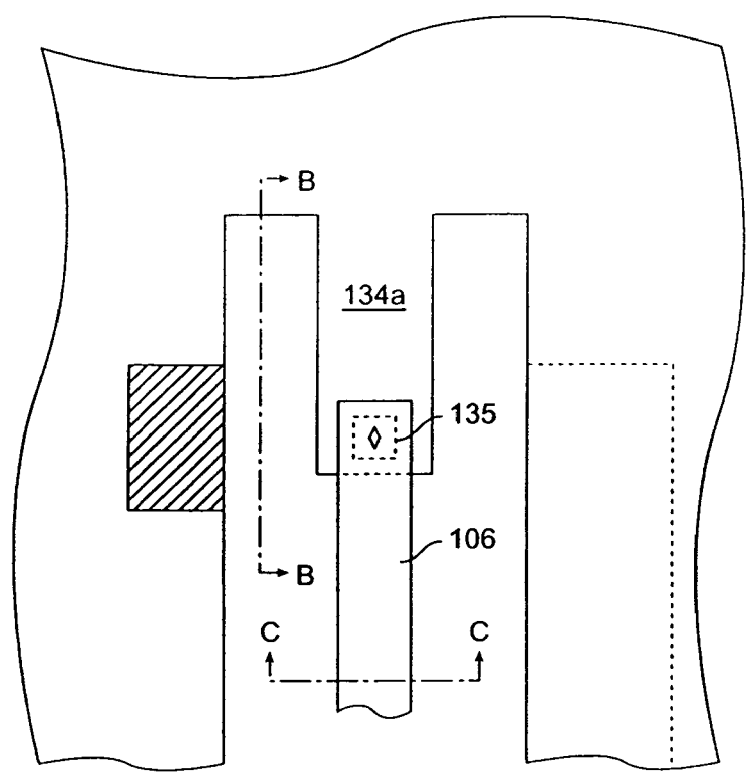
Figure 10B:
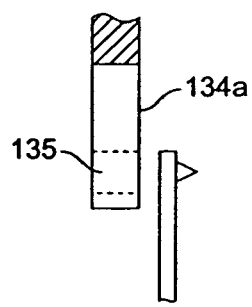
Figure 10C:
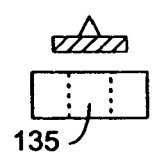
Figure 11A:
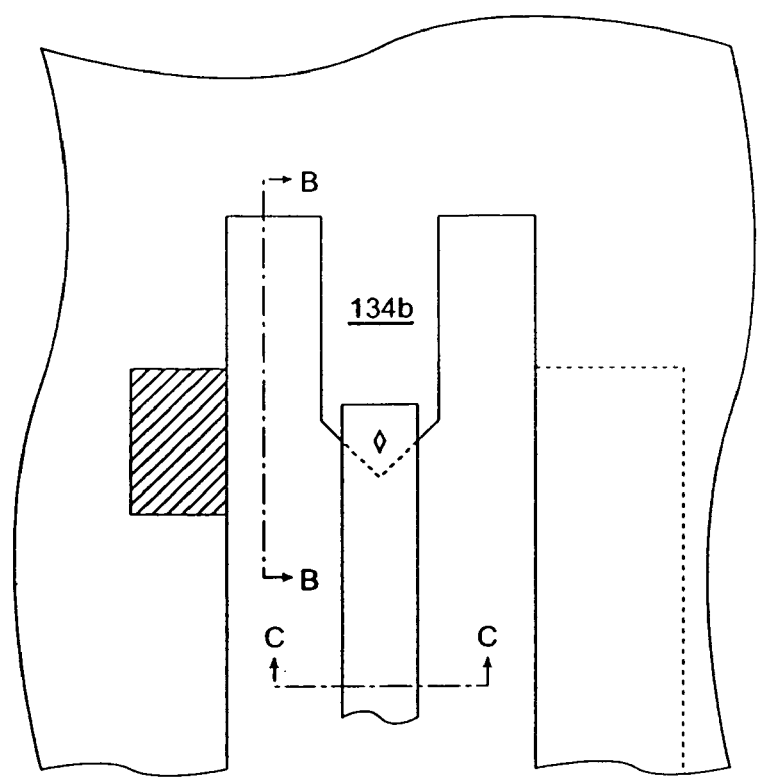
Figure 11B:
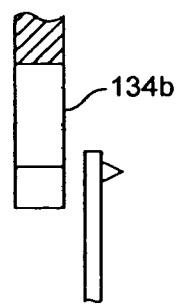
Figure 11C:
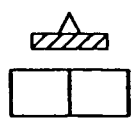
Figure 12A:
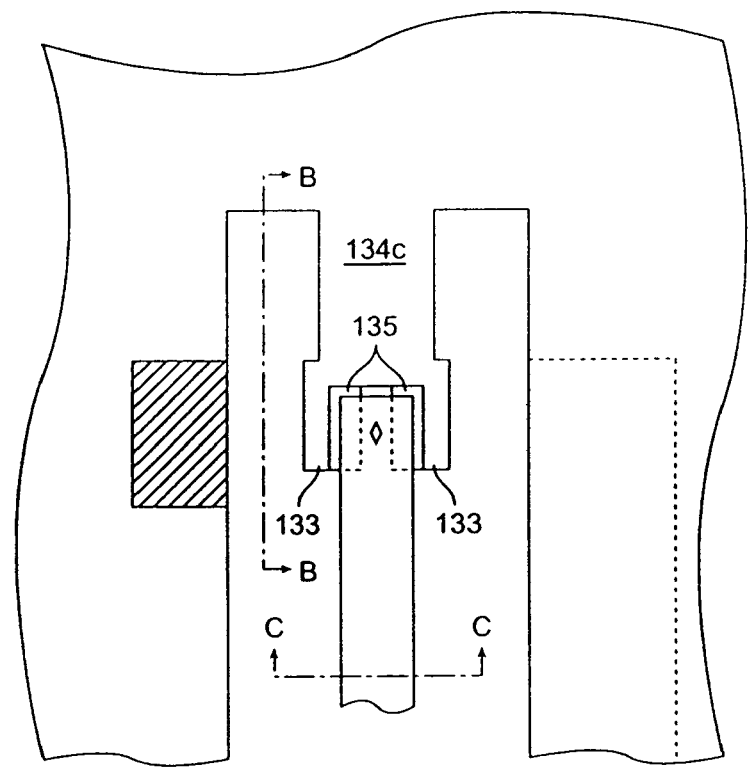
Figure 12B:
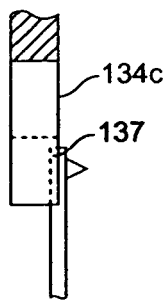
Figure 12C:
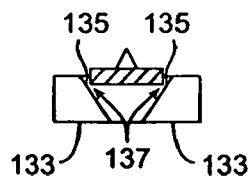
Figure 13A:
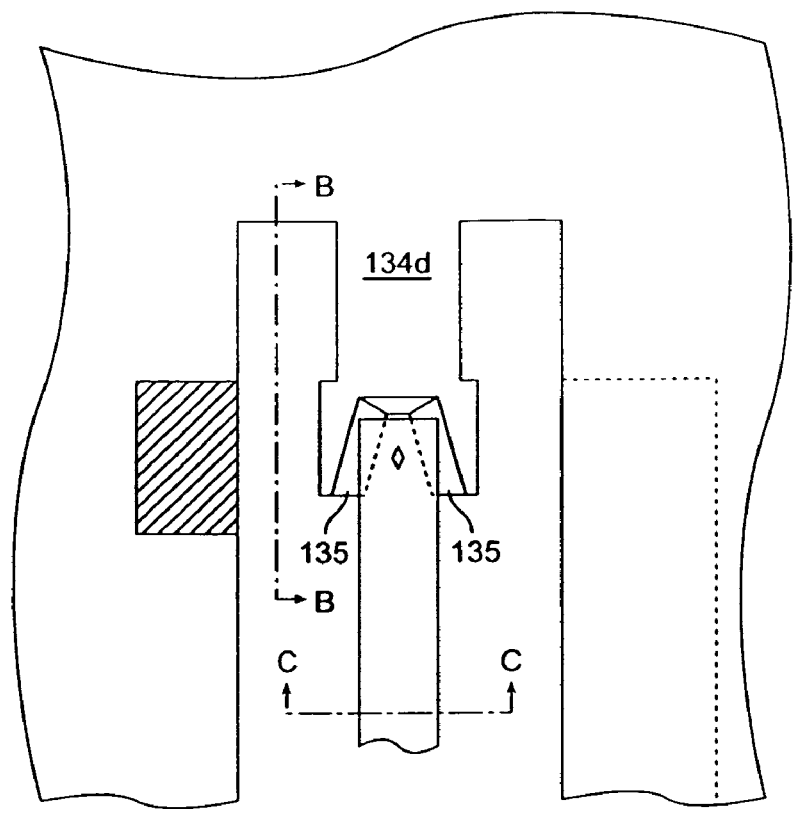
Figure 13B:
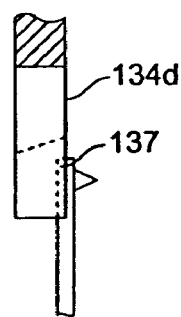
Figure 13C:
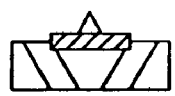

FIGS. 9A–9C show the configuration of FIG. 1. FIGS. 10A–10C show a configuration in which an amount of cantilever material is removed from the auxiliary cantilever 134a, leaving an opening 135. This presents a smaller total contacting surface area. FIGS. 11A–11C show a tapering cantilever construction 134b which also reduces the contacting surface area. FIGS. 12A–12C show a low stiction design where the free end of the cantilever is configured with sidearm components 133 having tapered or stepped interior sidewalls 135. This configuration can be used to constrain the motion of the primary cantilever 106 in the Z-direction and in the lateral (X-) direction, while keeping the stiction component to a minimum. This configuration provides a line contact 137 with the primary cantilever. The configuration shown in FIGS. 13A–13C show a variation wherein the sidewalls 135 of the sidearms 133 have an outward taper to further reduce stiction by providing a point contact 137 with the primary cantilever.

Figure 14:
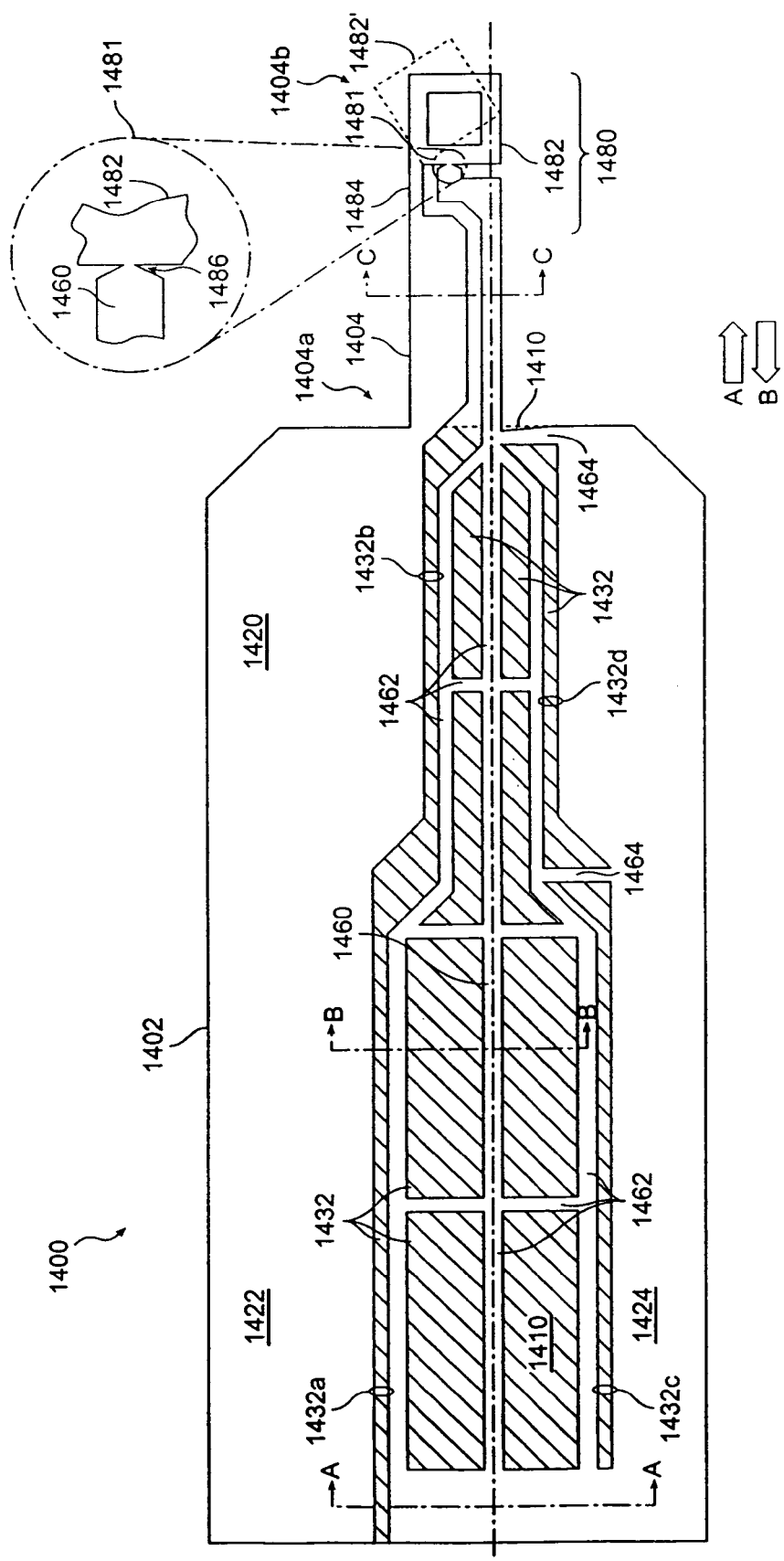
FIGS. 14 and 14A–14C show views of another embodiment of a probe assembly in accordance with the present invention.
Figure 14A:
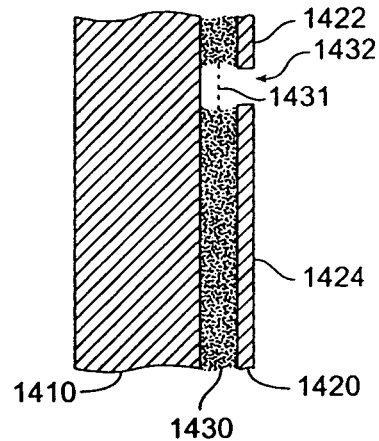
Figure 14B:
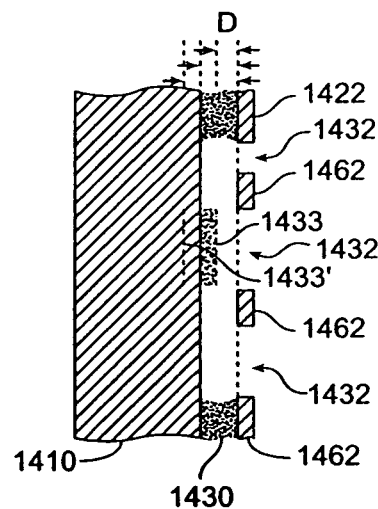
Figure 14C:
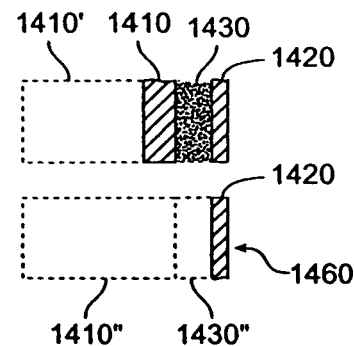

FIG. 14 is a top view schematized diagram, illustrating yet another embodiment of a probe assembly in accordance with the present invention, along with the various cross-sectional views of FIGS. 14A–14C. A probe assembly 1400 includes a base member (main body portion) 1402 and a cantilever 1404 having a fixed end 1404a attached to the base member, or otherwise integrally connected to the base member. The cantilever includes a free end 1404b. In accordance with some embodiments of the present invention, a kinetic segment assembly 1480 is provided, disposed proximate the free end 1404b of the cantilever 1404. As will be shown, various embodiments of the kinetic segment assembly can receive a tip device having micron- to sub-micron-scale dimensions. The kinetic segment assembly, as the name implies, comprises one or more action segments which cooperate to produce some action, wherein some of that action is coupled to the tip device to elicit some form of motion of the tip device.

The base member 1402 includes an upper layer of conductive material 1420. The upper layer is etched to form two conductive areas, shown generally by reference numerals 1422 and 1424. The conductive areas are defined by various etched regions, shown generally by reference numeral 1432. The etched regions expose the underlying layers, e.g., substrate 1410.

In accordance with some embodiments of the present invention, an actuator segment 1460 comprising segment portions 1462 is provided. The actuator segment is formed in the conductive area 1424. The actuator segment is attached to the base member 1402, in a region near view line A—A. The segment portions 1462 of the actuator segment are spaced apart from the underlying structure and extend toward the kinetic segment assembly 1480. The actuator segment is therefore a suspended structure and is connected to the kinetic segment assembly 1480.

FIG. 14A is cross-sectional view of the probe 1400 taken along view line A—A shown in FIG. 14. The elements illustrated in the figure are not to scale and are highly exaggerated to facilitate the description. The probe 1400 comprises a multi-layered structure having a substrate 1410 of electrically conductive material (e.g., bulk silicon). In typical embodiments of the present invention, the conductive material is semiconductor material. In other embodiments, the substrate might comprise other conductive material.

Disposed above the substrate is an insulative layer 1430, such as an oxide layer. For example, if the substrate material is silicon, the insulative layer might be a silicon dioxide layer. Disposed above the insulative layer is a conductive layer 1420. The conductive layer can be a metallic layer or a semiconductor layer, or even a combination of layers. In a particular embodiment the conductive layer 1420 is simply bulk silicon.

One of the etched regions 1432 is shown in FIG. 14A. The etched regions define the conductive areas 1422 and 1424. Referring to FIGS. 14 and 14A, the segment portions 1462 of the actuator segment 1460 extend from a region of the conductive area 1424 proximate the view line A—A. The cross-sectional view of FIG. 14A shows that the actuator segment is attached to the substrate 1410 via the insulative layer 1430.

In FIG. 14A, the portion of the etched region 1432 can be etched to a level 1431 as indicated in phantom, or even closer to the conductive layer 1420, rather than to the substrate 1410. However, conventional processing steps and techniques used to form the structures might result in removal of the insulative material in the portions of the etched region 1432 as shown in the figure.

FIG. 14B shows an additional cross-sectional view through the segment portions 1462 taken along view line B—B in FIG. 14. The portions of insulative layer 1430 beneath the segment portions 1462 are etched away sufficiently to leave a space between the material of the segment portions and the underlying structure. Consequently, the portion of the actuator segment 1460 beyond the attachment region (near view line A—A), is suspended above the underlying structure, e.g., substrate 1410.

The etched regions 1432 shown in FIG. 14B are etched all the way to the substrate 1410. However, it may not be necessary to remove all of the insulative material 1430. It might be sufficient to remove only enough insulative material to a level 1433 (indicated in FIG. 14B in phantom) sufficient to detach the material 1420 comprising a segment portion 1462 from the underlying layer. On the other hand, it might be desirable to etch below the substrate 1410 to a level 1433'. Any of these etch depths might suitable depending the desired clearance D between the segment portions 1462 of the actuator segment and the underlying layer. For example, stiffness of the conductive layer 1420 material might be a factor.

FIG. 14C shows a cross-sectional view through the cantilever 1404 along view line C—C shown in FIG. 14. Some of the substrate material 1410' comprising the cantilever might be removed to reduce the stiffness of the cantilever. To further reduce stiffness, the portion of the actuator segment 1460 along the cantilever can be devoid of substrate material 1410", as indicated in phantom. In an alternative construction, some portion of the substrate material 1410' and 1410" might be retained to increase the stiffness of the cantilever.

It can be appreciated that a desired stiffness can be attained by removing an appropriate amount of the substrate material.

The kinetic segment assembly 1480, in accordance with this particular embodiment of the invention, includes an active plate 1482. An appropriate tip device can be provided on the active plate. The plate has a first connection to the cantilever 1404 via a retaining strip 1484. The plate has a second connection to the actuator segment 1460 at a hinged region identified by the circled region 1481. An enlargement of the circled region, also illustrated in FIG. 14, shows that the hinged region comprises a nipple-like structure of conductive layer 1420, which in this particular embodiment is bulk silicon, connecting the actuator segment 1460 to the active plate 1482.

Operation of the probe assembly 1500 includes providing the conductive area 1422 with an electrical connection to a first voltage potential $V_0$, e.g., ground potential. A second voltage potential $V_1$, e.g., a non-zero voltage level, is selectively applied to the conductive area 1524.

In a first operating configuration, application of $V_1$ to conductive area 1424 creates a voltage potential that produces a current flow between conduction areas 1422 and 1424 along a first conduction path between conductive area 1422, the cantilever 1404, the retaining strip 1484, a portion of the active platform 1482, and the conductive area 1424 via the actuator segment 1460 (i.e., segment portions 1462). The segment portions 1462 of the actuator segment 1460 will heat up due to the flow of current. Since the segment portions are suspended segments, they will exhibit a relatively large degree of expansion due to the heating, much more so than if the segments were attached to the insulation layer 1430. Thus, the segment portions operate in unison as a stacked thermal array of elements to provide a large range of motion.

The resulting increase in the linear dimension of the actuator segment 1460 due to heating results in linear motion along the axis 1401 in the direction indicated by the direction arrow A to a position 1482' indicated in phantom. The linear motion is coupled to the active plate at the hinged region 1481, causing the plate to pivot about the retaining strip 1484. The nipple-like connection 1486 is a thin and relatively weak structure as compared to the other constituent structures of the probe assembly 1400 to encourage stress relief (including fracture). A properly fractured region produces a free but gapless mechanical contact to promote the mechanical movement goals.

When the voltage potential is removed (by disconnecting either $V_0$ or $V_1$), the segment portions 1462 cool and contract. The result is a decrease in the linear dimension of the actuator segment 1462 resulting in a linear motion in the direction indicated by the arrow B. The retaining strip 1484 exerts a restoring force due to its spring-like characteristic which, in conjunction with the dimensional change of the cooling actuator segment, restores the active platform 1482 to its original position.

Thus it can be appreciated that by properly applying potential differences between conductive areas 1422 and 1424 in the proper sequence, a reciprocating motion can be sustained. By providing an appropriately shaped tip of appropriate material, the probe assembly can be used as a cutting tool. Various tip shapes are disclosed in the above-referenced U.S. application for patent entitled, "Method and Apparatus for Tool and Tip Design for Nanomachining and Measurement." Further it is understood that the angular change of the position of the cutting edge of the tip or NanoTool™ may itself be a useful and even principle application of the device.

With reference to FIG. 14, it can be appreciated that the actuator segment 1460 can be subject to lateral deflections. If the deflection is large enough, the actuator segment can come into contact with the conductive area 1422, thus causing a short. It might be desirable to prevent such shorting. Thus, one or more retaining spring structures 1464 can be provided as needed to inhibit lateral deflections sufficient to cause shorting. The spring structures are designed to be sufficiently flexible so as not to impede the linear motion of the actuator segment. Alternatively, the width of the etched regions 1432a–1432d can be made sufficiently wide to allow for a tolerable amount of lateral movement.

From the top view illustration of FIG. 14, it can be seen that the actuator segment 1560 spans a considerable length of the probe assembly 1400 along the axis 1401, suspended above the underlying layer. Where the underlying layer is exposed substrate 1410, a downward deflection of the actuator segment toward the substrate would short the current flow. The retaining spring structures 1464, therefore, might serve a secondary function as suspension supporting elements to retard any downward deflection tendency of the segment portions 1462 comprising the actuator segment.

Figure 15:
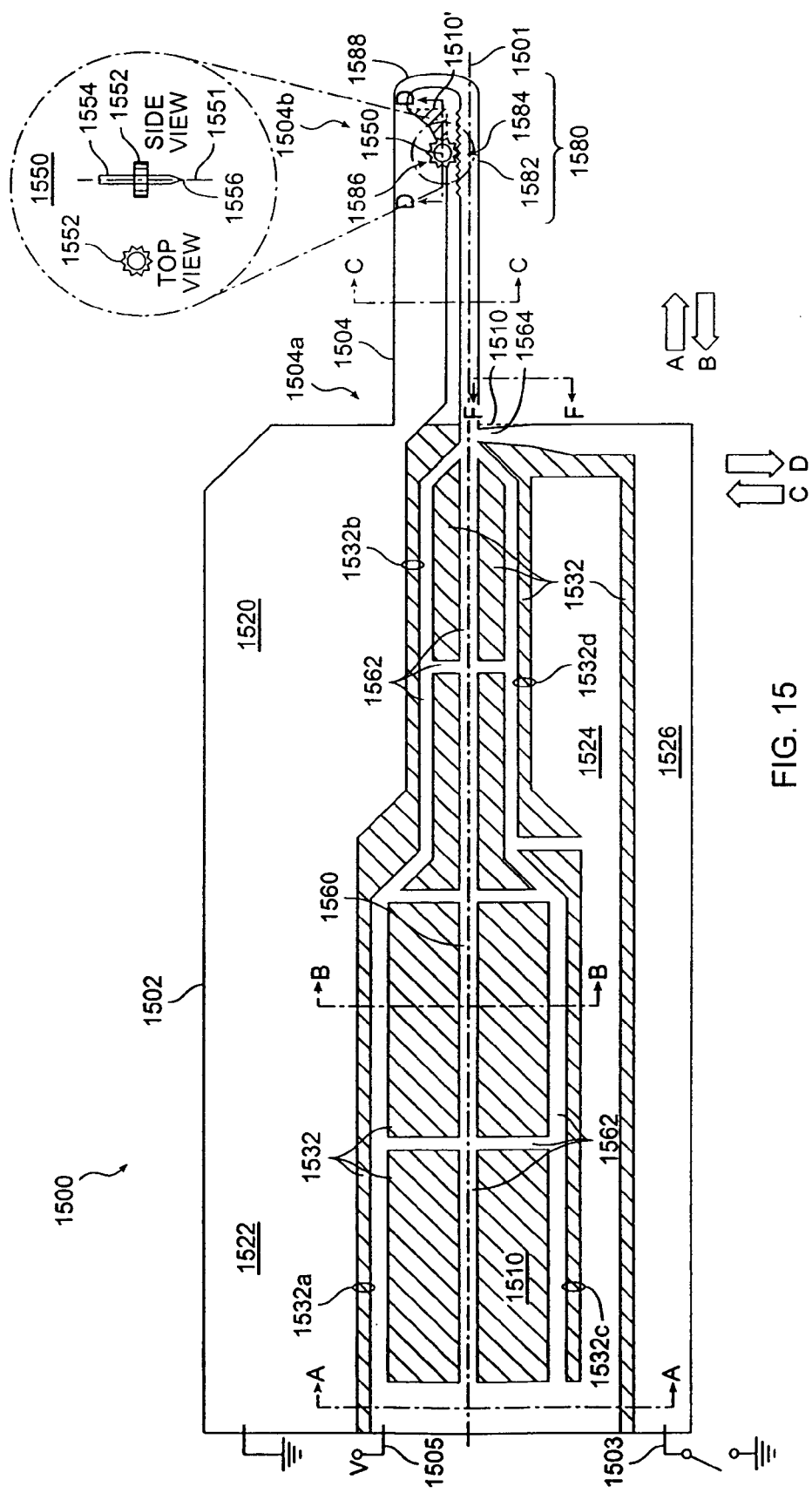
FIGS. 15 and 15A–15E show yet another embodiment of a probe assembly in accordance with the present invention.

FIG. 15 is a top view schematized diagram, illustrating yet another embodiment of a probe assembly in accordance with the present invention, along with the various cross-sectional views of FIGS. 15A–15E. A probe assembly 1500 includes a base member 1502 and a cantilever 1504 having a fixed end 1504a attached to the base member, or otherwise integrally connected to the base member. The cantilever includes a free end 1504b. In accordance with some embodiments of the present invention, a kinetic segment assembly 1580 is provided, disposed proximate the free end 1504b of the cantilever 1504.

The base member 1502 includes an upper layer of conductive material 1520. The upper layer is etched to form three conductive areas, shown generally by reference numerals 1522, 1524, and 1526. The conductive areas are defined by various etched regions, shown generally by reference numeral 1532. The etched regions expose the underlying layers, e.g., substrate 1510.

In accordance with some embodiments of the present invention, an actuator segment 1560 comprising segment portions 1562 is provided. The actuator segment is formed in the conductive area 1524. The actuator segment is attached to the base member 1502, in a region near view line A—A. The segment portions 1562 of the actuator segment are spaced apart from the underlying structure and extend toward the kinetic segment assembly 1580. The actuator segment is therefore a suspended structure and is connected to the kinetic segment assembly 1580.

Figure 15A:
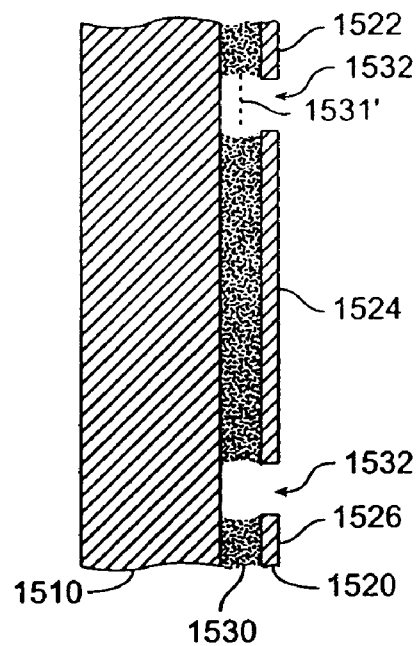

FIG. 15A is cross-sectional view of the probe 1500 taken along view line A—A shown in FIG. 15. The elements illustrated in the figure are not to scale and are highly exaggerated to facilitate the description. The probe 1500 comprises a multi-layered structure having a substrate 1510 of electrically conductive material. In typical embodiments of the present invention, the conductive material is semiconductor material. In other embodiments, the substrate might comprise other conductive material.

Disposed above the substrate is an insulative layer 1530, such as an oxide layer. For example, if the substrate material is silicon, the insulative layer might be a silicon dioxide layer. Disposed above the insulative layer is a conductive layer 1520. The conductive layer can be a metallic layer or a semiconductor layer or even a combination of layers. In a particular embodiment the conductive layer 1520 is simply bulk silicon.

The etched regions 1532 are shown in FIG. 15A. The etched regions define the conductive areas 1522, 1524, and 1526. Referring to FIGS. 15 and 15A, the segment portions 1562 of the actuator segment 1560 extend from a region of the conductive area 1524 proximate the view line A—A. The cross-sectional view of FIG. 15A shows that the actuator segment is attached to the substrate 1510 via the insulative layer 1530.

In FIG. 15A, the portion of the etched region 1532 can be etched to a level 1531 as indicated in phantom, or even closer to the conductive layer 1520, rather than to the substrate 1510. However, conventional processing steps and techniques used to form the structures might result in removal of the insulative material in the portions of the etched region 1532 as shown in the figure.

Figure 15B:
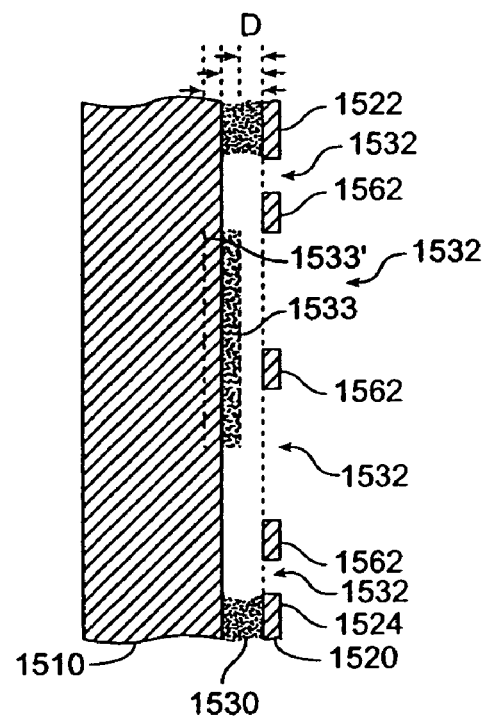

FIG. 15B shows an additional cross-sectional view through the segment portions 1562 taken along view line B—B in FIG. 15. The portions of insulative layer 1530 beneath the segment portions 1562 are etched away sufficiently to leave a space between the material of the segment portions and the underlying structure. Consequently, the portion of the actuator segment 1560 beyond the attachment region (near view line A—A), is suspended above the underlying structure, e.g., substrate 1510.

The etched regions 1532 shown in FIG. 15B are etched all the way to the substrate 1510. However, it may not be necessary to remove all of the insulative material 1530. It might be sufficient to remove only enough insulative material to a level 1533 (indicated in FIG. 15B in phantom) sufficient to detach the material 1520 comprising a segment portion 1562 from the underlying layer. On the other hand, it might be desirable to etch below the substrate 1510 to a level 1533'. Any of these etch depths might suitable depending the desired clearance D between the segment portions 1562 of the actuator segment and the underlying layer. For example, stiffness of the conductive layer 1520 material might be a factor.

Figure 15C:
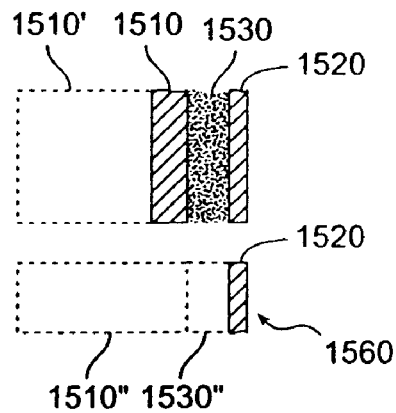

FIG. 15C shows a cross-sectional view through the cantilever 1504 along view line C—C shown in FIG. 15. Some of the substrate material 1510' comprising the cantilever might be removed to reduce the stiffness of the cantilever. To further reduce stiffness, the portion of the actuator segment 1560 along the cantilever can be devoid of substrate material 1510", as indicated in phantom. In an alternative construction, some portion of the substrate material 1510' and 1510" might be retained to increase the stiffness of the cantilever. It can be appreciated that a desired stiffness can be attained by removing an appropriate amount of the substrate material.

The kinetic assembly segment 1580, in accordance with this particular embodiment of the invention, includes a tip holder 1586 disposed proximate the free end 1504b of the cantilever 1504. The action members of the kinetic assembly include a drive track 1582 that is flexibly connected to the cantilever via a resilient member 1588. The drive track has a traction surface 1584, and is arranged so that the traction surface is in facing relation to the tip holder 1586. The actuator segment 1560 is connected to the drive track. In this particular embodiment, the actuator segment and the drive track are an integral unit. A portion of the conductive layer 1520 therefore constitutes the drive track 1582.

The tip holder 1586 is configured to hold a micron-scale tip 1550. In accordance with an embodiment of the invention, the micron-scale tip comprises a cylindrical shaft 1554 and an annular member 1552 disposed about the shaft.

Figure 15D:
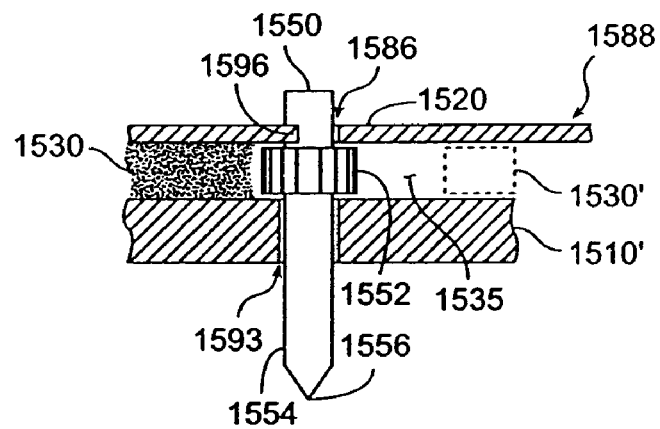
Figure 15E:
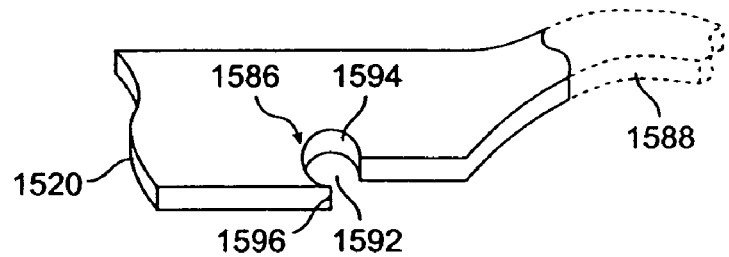

FIG. 15D is a side view seen along view line D—D shown in FIG. 15, illustrating additional detail of the tip holder 1586. FIG. 15E is an enlarged perspective view featuring the tip holder. It can be seen from FIGS. 15D and 15E that the tip holder comprises an opening 1596 formed in the conductive layer 1520. In one embodiment of the invention the opening 1596 is C-shaped having a gap that is slightly less than the diameter of a tip 1550 to be received in the tip holder. This C-shaped configuration provides a snap-fit rotational securement about the shaft 1554 of a received tip. The shaft rests against a bearing surface 1594 in the opening 1596. A corresponding opening 1593 is formed in the substrate 1510'. A similar C-shaped opening can be provided for opening 1593, as for opening 1592. The openings 1592, 1593 are sized with respect to the diameter of the shaft. It can be appreciated that the portions of the cylindrical shaft above and below the annular member can be of different diameters. Consequently the sizes of the openings 1592 and 1593 may differ.

As can be seen in FIG. 15D, the thickness of the substrate 1510' is considerably reduced at the tip holder 1586 to accommodate the micron-scaled size of the tip 1550. Thus, the thickness of the substrate 1510' can be formed according to the expected range of tip lengths to be used with the probe assembly 1500.

The insulating layer 1530 at the tip holder 1586 is removed of sufficient material to provide a space 1535 for housing the annular member 1552 of the tip. An amount of insulating material 1530' shown in phantom in FIG. 15D can be retained. The insulating material 1530' might be desirable to provide some degree of support for the resilient member 1588.

In one embodiment of the invention, the drive track 1582 is a gear rack wherein the traction surface 1584 comprises a set of gear teeth. The traction surface can be comprised of the conduction layer 1520, or can be a separate material. In this particular embodiment, the annular member 1552 of a tip 1550 would be a gear structure having matching gear teeth. By engaging the gear teeth of the traction surface with the gear teeth of the tip's annular member and linearly translating the drive track, rotational motion of the tip about its axis 1551 can be produced.

In another embodiment of the invention, the drive track 1582 is a friction track wherein the traction surface 1584 comprises a bare silicon surface deposited on the drive track, or otherwise disposed thereon. Likewise, the annular member 1552 of a tip comprises a bare silicon surface. By contacting the silicon surface of the traction surface with the silicon surface of the tip's annular member and linearly translating the drive track, rotational motion of the tip about its axis 1551 can be produced due to the frictional forces of stiction between the contacting silicon surfaces.

Returning to FIG. 15, operation of the probe assembly 1500 includes providing the conductive areas 1522 and 1526 with an electrical connection to a first voltage potential $V_0$, e.g., ground potential. Conductive area 1522 is tied to potential $V_0$. Switch 1503 selectively connects conductive area 1526 to potential $V_0$. A second voltage potential $V_1$, e.g., a non-zero voltage level, is selectively applied to conductive area 1524.

In a first switching configuration where conductive area 1526 is floating, application of $V_1$ to conductive area 1524 creates a voltage potential that produces a current flow between conductive areas 1522 and 1524 along a first conduction path between conductive area 1522, the cantilever 1504, the resilient member 1588, the drive track 1582, and conductive area 1524 via the actuator segment 1560 (i.e., segment portions 1562). The segment portions 1562 of the actuator segment 1560, by virtue of being designed with cross-sectional dimensions smaller than those of the other conducting portions along the first conduction path, have a higher resistivity. Consequently, the segment portions 1562 will heat up. Furthermore, since the segment portions are suspended segments, they will exhibit a relatively large degree of expansion due to heating, much more so than if the segment portions were attached to the insulation layer 1530. Thus, the segment portions operate in unison as a stacked thermal array of elements to provide a large range of motion.

The resulting increase in the linear dimension of the actuator segment 1560 due to heating is translated into a linear motion of the drive track 1582 along the axis 1501 in the direction indicated by the direction arrow A. Assuming the traction surface 1584 is in contacting engagement with the annular member 1552 of a tip 1550 received in the tip holder 1586, the linear translation of the drive track is translated into a counter-clockwise rotational motion of the tip. The resilient member 1588, though it exerts a restoring force due to is spring-like nature, does not significantly impede the linear translation of the drive track.

When the voltage potential is removed (by disconnecting either $V_0$ or $V_1$), the segment portions 1562 cool and contract. The resulting decrease in the linear dimension of the actuator segment 1562, in conjunction with the restoring force exerted by the resilient member 1588, causes linear motion of the drive track 1582 in the direction indicated by the arrow B. If the traction surface is engaged with the tip 1550, then the linear translation motion is transferred to the tip to produce a clockwise rotational motion.

Next, consider a switching configuration wherein $V_0$ is applied to conductive area 1526. When $V_1$ is applied to conductive area 1524, the potential difference creates a flow of electrical current along the first conduction path, and also along a second conduction path. The second conduction path is a path between conductive area 1524 via the actuator segment 1560 (i.e., segment portions 1562) and conductive area 1526 via a secondary actuator segment 1564. The secondary actuator segment 1564 is designed with a sufficiently small cross-sectional area such that the resulting resistivity of the material will produce sufficient heat to cause a dimensional change in the segment, namely, a lengthening of the segment. This kinetic action urges the actuator segment 1560 in the direction indicated by the arrow C. Consequently, the drive track 1582 is urged forward so that the traction surface 1584 comes into engaging contact with the annular member 1552 of a tip 1559 received in the tip holder 1586. The resilient member 1588 can be designed with a shape such that its restoring force does not overcome the expansion of the heated secondary actuator segment 1564.

When the potential between conductive surfaces 1524 and 1526 is removed, the current flow ceases and cooling of the secondary actuator segment 1564 occurs. The resulting dimensional change as the segment cools, along with the restoring force exerted the resilient member 1588, urges the actuator segment 1560 and the drive track 1582 in the direction indicated by the arrow D. Consequently, the traction surface 1584 comes out of contact with the annular member 1552.

Thus it can be appreciated that by properly applying potential differences between conductive areas 1522 and 1524 and between conductive areas 1524 and 1526 in a proper sequence, a rotational motion can be sustained. The rotational motion can be a sustained in a clockwise rotation or a counter-clockwise rotation. The rotational motion can be a reciprocating rotation, where the motion alternates between clockwise and counter-clockwise rotations.

Returning to FIGS. 15D and 15E, it can be appreciated that there are bearing surfaces where a tip 1550 is received in the probe assembly 1500. There is a bearing surface 1594 in the tip holder 1586. Similarly, there are bearing surfaces where the conductive layer 1520 comes into contact with the annular member 1552, and where the substrate 1510' comes into contact with the annular member. It might be desirable to treat these surfaces to increase their durability and to reduce frictional and stictional forces. Such treatments are disclosed more fully in the above-referenced U.S. application for patent entitled "Low Friction Moving Interfaces in Micromachines and Nanomachines."

With reference to FIG. 15, it can be appreciated that the actuator segment 1560 can be subject to lateral deflections. If the deflection is large enough, the actuator segment can come into contact with either of the conductive areas 1522, 1526, thus causing a short. It might be desirable to prevent such shorting. The secondary actuator segment 1564 can provide the additional function of inhibiting lateral movement of the actuator segment. Additional retaining spring structures such as structures 1464 shown in FIG. 14 can be provided as needed. The secondary actuator 1564 can be designed to be sufficiently flexible so as not to impede the linear motion of the actuator segment 1560. Alternatively, the width of the etched regions 1532a–1532d can be made sufficiently wide to allow for a tolerable amount of lateral movement.

From the top view illustration of FIG. 15, it can be seen that the actuator segment 1560 spans a considerable length of the probe assembly 1500 along the axis 1501, suspended above the underlying layer. Where the underlying layer is exposed substrate 1510, a downward deflection of the actuator segment toward the substrate would short the current flow. The secondary actuator segment 1564 can further serve as a suspension supporting element to retard any downward deflection tendency. Although not shown these elements in all embodiments may be made electrically isolated from the surrounding active layer by removing active layer material around the base of the suspension in a region large enough to retain the mechanical integrity with the insulating layer, alternately such isolated contacts may be activiely switched or changed to affect overall device function and mechanical motion.

The disclosed illustrative embodiments of the present invention describe probe assemblies which are particularly suited for various nano-scale machining techniques used to produce micro electromechanical machines (MEMs). The disclosed probe assemblies, and the numerous variations that can be readily obtained by those of ordinary skill in possession of the teachings of the present invention, can be used in nanomachining processing techniques disclosed in the above-referenced U.S. applications for patent entitled, "Methods and Apparatus for Nanolapping" and "Nanomachining Method and Apparatus."

Figure 16:
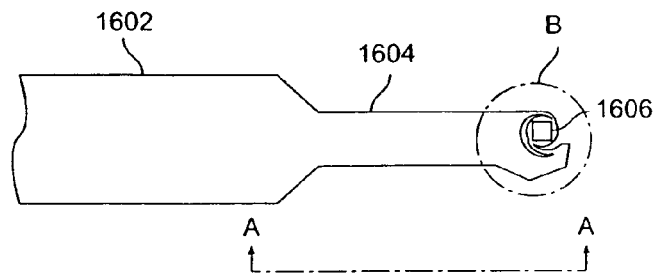
FIGS. 16, 16A, and 16B show still another embodiment of a probe assembly in accordance with the present invention.

FIG. 16 is a top view of another illustrative embodiment of a probe assembly 1600 according to the present invention. The probe comprises a main body portion 1602 to which the fixed end of a cantilever 1604 is attached. A tip 1606 is disposed at a free end of the cantilever.

Figure 16A:
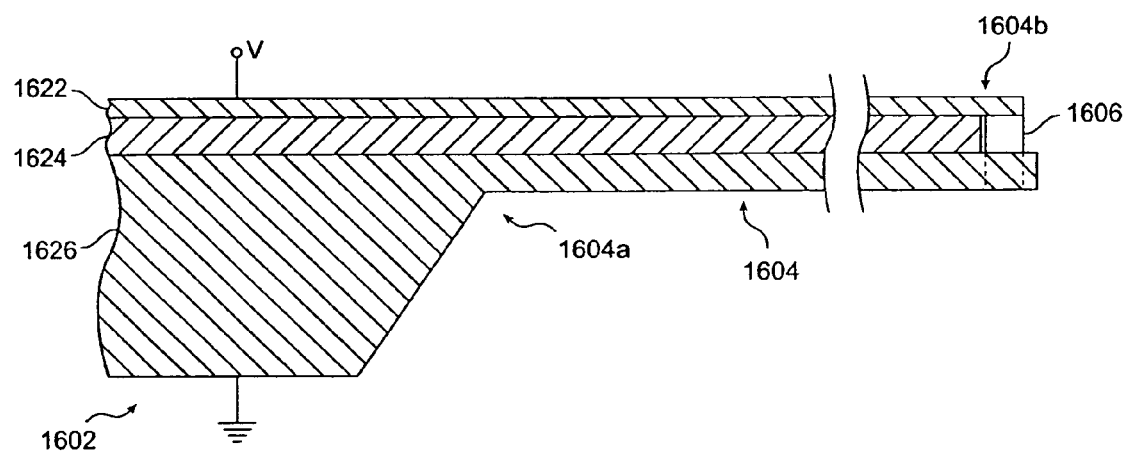

FIG. 16A is a cross-sectional view taken along view line A—A shown in FIG. 16. As can be seen the probe assembly 1600 comprises three layers: a substrate layer 1626 (e.g., bulk silicon, or other conductive or semiconductive material); an insulative layer 1624 (e.g., an oxide of silicon); and a conductive layer 1622 which can be silicon or a metal layer (e.g., aluminum, gold, paladium, etc.). Disposed at the free end 1604a of the cantilever 1604, is an active plate 1606. The active plate is in electrical contact with the substrate layer 1626. The insulative layer separates the conductive layer 1622 from the underlying substrate material. The active plate 1606 is exposed through the insulative layer. The conductive layer is disposed in contact with the active plate.

Figure 16B:
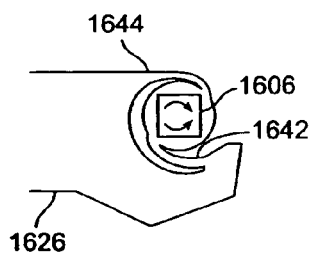

FIG. 16B is an enlarged view of the circled region shown in FIG. 16, showing a top view of the active plate 1606 and the surrounding structure. It can be seen that the substrate 1626 includes arm portions 1642, 1644 which connect to the active plate. In an embodiment, the active plate and arm portions are fashioned from the same block of substrate material using known fabrication techniques.

In operation, a voltage potential is established between the conductive layer 1622 and the substrate 1624 (see FIG. 16A). A current flow results from the conductive layer to the active plate 1606, and then to the substrate. Referring to FIG. 16B, the current flows from the active plate through the arm portions 1642 and 1644 to the substrate layer 1626. The current flow through the arm portions will result in local heating, thus causing the arm portions to lengthen. The active plate will tend to twist in a clockwise direction.

When the potential is removed and the current ceases, the arm portions 1642, 1644 will cool. Consequently, there will be a contraction and thus a shortening of the arm portions. The active plate 1606 will then tend to twist in the counterclockwise direction.

Referring to FIG. 16A, it can be seen that the active plate is attached or otherwise connected to the conductive layer 1622, which might tend to resist the twisting motion caused by the expanding arm portions. However, the local heating tends to "soften" the material at the interface between the active plate and the conductive layer 1622 and thus permit a twisting action.

An appropriate tip formed or otherwise disposed on the active plate can be used in conjunction with this twisting motion to perform nanomachining operations and the like.

Various disclosed illustrative embodiments of the present invention can facilitate SPM methods. The probes provide an ability to change the behavior of the probe assembly. Simple means are disclosed, including software means, for implementing the change conditions on conventional and older SPMs. Apparatus and techniques are disclosed to protect the delicate probe structure of an SPM while handling, shipping, manually or automatically loading said probe or probes. Embodiments of the invention allows for making electrical contact at a higher force then normal contact for a given probe. Embodiments of the invention can provide a capacitively coupled force means and/or force measuring means independently or in conjunction with a probe deflection measurement subsystem (such as an optical lever or interferometer). In an alternative embodiment of the invention, the auxiliary cantilever can be constructed as to optically couple the probe tip for nanospectrophotometry and other similar optical measures including polarimetry. This optical coupling may also be used to operate in NSOM SPM modalities and to excite second and third harmonic optical response from the sample or probe tip. In still yet another embodiment of the invention, the auxiliary cantilever structure can excite acoustic energy into the probe tip and use this energy to characterize the sample under consideration, or this energy may be used to perform nanoacoustic welding or machining of the object under the probe or probe tool tip. In yet another embodiment of the invention, a chemical material can be injected or brought into active operation by the action of the mechanism in conjunction with appropriate motion and a fixed or static member (or a fixed mechanism with movable member and/or both acting alternately or together in motion).

What is claimed is:

1. A probe suitable for use in a scanning probe microscope system comprising:
 a main body portion;
 a scanning cantilever coupled to the main body portion, the scanning cantilever having a probe tip disposed at a free end thereof to perform scanning; and
 an interference structure coupled to the main body portion, the interference structure aligned with a line of motion of the scanning cantilever to limit its range of deflection along at least a first direction of travel during a scanning operation.

2. The probe of claim 1 wherein the scanning cantilever has a stiffness characteristic different from that of the interference structure.

3. The probe of claim 1 wherein the interference structure comprises a first member and a second member, each member having a portion aligned relative to the scanning cantilever to limit the range of deflection along the first direction of travel.

4. The probe of claim 1 wherein the interference structure is a second cantilever having a free end aligned with the line of motion of the free end of the scanning cantilever to limit the range of deflection along the first direction of travel.

5. The probe of claim 1 wherein the interference structure is a spanning member, wherein the line of motion of the free end of the scanning cantilever intersects a portion of the spanning so as to limit the range of deflection thereof along the first direction of travel.

6. A scanning probe microscopy system including a scanning probe as claimed in claim 1.

7. A probe for a scanning probe microscopy system comprising:
 a main body portion configured for attachment to a translation device;
 a first cantilever coupled to the main body portion;
 probe means for sensing atomic features of a surface being scanned, the probe means disposed on a free end of the first cantilever;
 interference means, disposed relative to the first cantilever, for limiting a line of motion of the first cantilever when it is deflected in a first direction during a scanning operation.

8. The probe of claim 7 wherein the interference means comprises a first member and a second member, each member having a portion aligned relative to the first cantilever to limit the range of deflection along the first direction of travel.

9. The probe of claim 7 wherein the interference means is a second cantilever having a free end aligned with the line of motion of the free end of the first cantilever to limit the range of deflection along the first direction of travel.

10. The probe of claim 9 wherein the second cantilever is in parallel relation to the first cantilever.

11. The probe of claim 7 wherein the interference means comprises a spanning member having a region thereof that intersects with the line of motion of the first cantilever when it is deflected in a first direction during a scanning operation.

* * * * *